United States Patent
Iijima et al.

(10) Patent No.: US 10,096,837 B2
(45) Date of Patent: Oct. 9, 2018

(54) SUPPORTING CARBON MATERIAL FOR SOLID POLYMER FUEL CELL AND CATALYST METAL PARTICLE-SUPPORTING CARBON MATERIAL

(71) Applicants: NIPPON STEEL & SUMITOMO METAL CORPORATION, Tokyo (JP); NIPPON STEEL & SUMIKIN CHEMICAL CO., LTD., Tokyo (JP)

(72) Inventors: Takashi Iijima, Tokyo (JP); Masataka Hiyoshi, Tokyo (JP); Katsumasa Matsumoto, Tokyo (JP); Hiroyuki Hayashida, Kitakyushu-shi (JP); Kazuhiko Mizuuchi, Kitakyushu-shi (JP); Takumi Kouno, Kitakyushu-shi (JP); Masakazu Higuchi, Kitakyushu-shi (JP); Masakazu Katayama, Kitakyushu-shi (JP)

(73) Assignees: NIPPON STEEL & SUMITOMO METAL CORPORATION, Tokyo (JP); NIPPON STEEL & SUMIKIN CHEMICAL CO., LTD., Tokyo (JP)

( * ) Notice: Subject to any disclaimer, the term of this patent is extended or adjusted under 35 U.S.C. 154(b) by 200 days.

(21) Appl. No.: 15/126,638

(22) PCT Filed: Mar. 19, 2015

(86) PCT No.: PCT/JP2015/058376
§ 371 (c)(1),
(2) Date: Sep. 16, 2016

(87) PCT Pub. No.: WO2015/141810
PCT Pub. Date: Sep. 24, 2015

(65) Prior Publication Data
US 2017/0194652 A1    Jul. 6, 2017

(30) Foreign Application Priority Data

| Mar. 19, 2014 | (JP) | 2014-057275 |
| Apr. 23, 2014 | (JP) | 2014-088762 |
| Jun. 24, 2014 | (JP) | 2014-129084 |

(51) Int. Cl.
*H01M 4/88* (2006.01)
*C01B 31/02* (2006.01)
(Continued)

(52) U.S. Cl.
CPC .......... *H01M 4/8807* (2013.01); *C01B 31/02* (2013.01); *H01M 4/926* (2013.01);
(Continued)

(58) Field of Classification Search
CPC ...... H01M 4/8807; H01M 4/926; C01B 31/02
(Continued)

(56) References Cited

U.S. PATENT DOCUMENTS

| 2003/0108481 A1 | 6/2003 | Igarashi et al. |
| 2009/0169974 A1 | 7/2009 | Tabata et al. |

(Continued)

FOREIGN PATENT DOCUMENTS

| EP | 2822069 A1 | 1/2015 |
| EP | 2999039 A1 | 3/2016 |

(Continued)

OTHER PUBLICATIONS

International Search Report for PCT/JP2015/058376 dated Jun. 16, 2015.
(Continued)

*Primary Examiner* — Basia A Ridley
*Assistant Examiner* — James M Erwin
(74) *Attorney, Agent, or Firm* — Birch, Stewart, Kolasch & Birch, LLP

(57) ABSTRACT

Provided are: a supporting carbon material for a solid polymer fuel cell, said supporting carbon material making it possible to produce a high-performance solid polymer fuel cell in which there is little decrease in power generation performance as a result of repeated battery load fluctuation that inevitably occurs during operation of the solid polymer
(Continued)

(a) Surface area (b) Outer surface area fuel cell; and a catalyst metal particle-supporting carbon material. The present invention relates to: a supporting carbon material for a solid polymer fuel cell, said supporting carbon material being a porous carbon material in which the specific surface area of mesopores having a pore diameter of 2-50 nm according to nitrogen adsorption measurement is 600-1,600 m$^2$/g, the relative intensity ratio (IG'/IG) of the peak intensity (IG') of the G-band 2,650-2,700 cm$^{-1}$ range to the peak intensity (IG) of the G-band 1,550-1,650 cm$^{-1}$ range in the Raman spectrum is 0.8-2.2, and the peak position of the G'-band is 2,660-2,670 cm$^{-1}$; and a catalyst metal particle-supporting carbon material.

20 Claims, 1 Drawing Sheet

(51) Int. Cl.
    *H01M 4/92*     (2006.01)
    *H01M 8/1018*     (2016.01)

(52) U.S. Cl.
    CPC ...... *C01P 2006/12* (2013.01); *C01P 2006/14* (2013.01); *H01M 2008/1095* (2013.01)

(58) Field of Classification Search
    USPC .......................................... 429/526
    See application file for complete search history.

(56) References Cited

U.S. PATENT DOCUMENTS

| | | |
|---|---|---|
| 2010/0159301 A1 | 6/2010 | Tanuma |
| 2011/0058308 A1 | 3/2011 | Nishi et al. |
| 2015/0030966 A1 | 1/2015 | Shimoi et al. |
| 2016/0233520 A1 | 8/2016 | Takahashi et al. |

FOREIGN PATENT DOCUMENTS

| | | |
|---|---|---|
| JP | 2003-201417 A | 7/2003 |
| JP | 2007-141588 A | 6/2007 |
| JP | 2008-16208 A | 1/2008 |
| JP | 2008-41253 A | 2/2008 |
| JP | 2010-146965 A | 7/2010 |
| JP | 2013-18697 A | 1/2013 |
| WO | WO 2007/116924 A1 | 10/2007 |
| WO | WO 2009/075264 A1 | 6/2009 |
| WO | WO 2013/129417 A1 | 9/2013 |
| WO | WO 2015/045852 A1 | 4/2015 |

OTHER PUBLICATIONS

Written Opinion of the International Searching Authority for PCT/JP2015/058376 (PCT/ISA/237) dated Jun. 16, 2015.
Liu et al., "Temperature Dependence of the Electrical Transport Properties in Few-Layer Graphene Interconnects," Nanoscale Research Letters, vol. 8, No. 335, Jul. 25, 2013 (Dec. 1, 2013), pp. 1-7.
Lopez-Gonzalez et al., "Adsorption of Nitrogen on Carbon Adsorbents at Low Pressures Between 69° and 90° K," Journal of Research of the National Bureau of Standards, vol. 55, No. 1, Research paper 2600, Jul. 1955, pp. 11-18.
Nguyen et al., "Excitation Energy Dependent Raman Signatures of ABA- and ABC-Stacked Few-Layer Graphene," Scientific Reports, vol. 4, No. 4630, Apr. 10, 2014, pp. 1-5.
Timofeeva et al., "Estimation of the Thickness of Graphite Nanofilm on a Silicon Substrate by Using Energy Dispersive X-Ray Analysis Data," Nanotechnologies in Russia, vol. 11, Nos. 7-8, Aug. 12, 2016, pp. 454-460.

(a) Surface area  (b) Outer surface area (a)  (b)

SUPPORTING CARBON MATERIAL FOR SOLID POLYMER FUEL CELL AND CATALYST METAL PARTICLE-SUPPORTING CARBON MATERIAL

TECHNICAL FIELD

The present invention relates to a supporting carbon material and catalyst metal particle-supporting carbon material used as a starting material for production at the time of producing a solid polymer fuel cell. In particular, it relates to a supporting carbon material for a solid polymer fuel cell and catalyst metal particle-supporting carbon material support carbon material enabling the production of a high performance solid polymer fuel cell with little drop in power generation performance due to repeated load fluctuations of the solid polymer fuel cell which unavoidably occur at the time of operation of the cell.

BACKGROUND ART

A general solid polymer fuel cell is comprised of a basic structure of a proton conductive electrolyte membrane, catalyst layers forming the anode and cathode arranged at the two surfaces of the same, further, gas diffusion layers arranged straddling these at the outsides, and, furthermore, separators arranged at the outsides of these. This basic structure is used as a unit cell. Usually, a plurality of unit cells are stacked to obtain the required output.

Further, to take out current from a fuel cell of the above basic structure, oxygen or air or other oxidizing gas is supplied from gas channels of the separators arranged at both the anode and cathode to the cathode side and, further, hydrogen or other reducing gas is supplied to the anode side through the respective gas diffusion layers to the catalyst layers. For example, if utilizing hydrogen gas and oxygen gas, the energy difference (potential difference) between the following chemical reaction occurring on the anode catalyst metal (oxidation reaction):

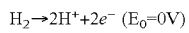

$$H_2 \rightarrow 2H^+ + 2e^- \quad (E_0=0V)$$

and the following chemical reaction occurring on the cathode catalyst metal (reduction reaction)

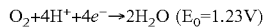

$$O_2 + 4H^+ + 4e^- \rightarrow 2H_2O \quad (E_0=1.23V)$$

is utilized to generate power.

Here, as the catalyst of the oxidation reaction and reduction reaction, a catalyst metal particle-supporting carbon material comprised of a supporting carbon material made to physically support catalyst metal particles having a catalytic action has been used. Various studies have been conducted up to now on metals having this catalytic action, but a solid polymer fuel cell operates in a strongly acidic environment, so platinum exhibits the highest reaction activity as pure metal in both an oxidation reaction and reduction reaction. For this reason, platinum alone or an alloy mainly comprised of platinum has solely been used for the catalysts in the energy farms currently engaged in commercial production or in the fuel cell vehicles considered close to able to be practically used. In general, the above oxidation reaction and reduction reaction occur on catalyst metal particles, so to raise the rate of utilization of the catalyst, making the specific surface area per mass of the catalyst metal particles larger is essential. For this reason, catalyst metal particles are generally several nm or more in size.

Further, as the support for supporting the catalyst metal particles, from the viewpoints of the electron conductivity, chemical stability, and electrochemical stability, a carbon material has been used. Further, to raise the supporting ability of the support, that is, to increase the sites for adsorbing and supporting the catalyst metal particles, a carbon material with a large specific surface area has been used. Specifically, a carbon material comprised of particles of a size of several 10s to several 100s of nm or so which are made porous at their surfaces to facilitate adsorption of catalyst metal particles (porous carbon materials) has generally been used.

Further, when forming a catalyst layer, to enable diffusion of the reaction gas through this catalyst layer without resistance, the support must be formed with pores for flow of the gas. As the form of a carbon material realizing this object, a carbon material having "structures branched three-dimensionally" called "tree-branch structures" has generally been used. The carbon material spreading the most at the present point of time is the carbon material called "carbon black". This carbon black has structures of particles of 10s of nm size connected in tree-branch shapes (aggregate). When forming the catalyst layer, the spaces between the branches become pores for gas diffusion. A large current characteristic requiring a large amount of gas and other superior characteristics are exhibited relating to gas diffusion.

As the carbon material having "structures branched three-dimensionally" referred to here, specifically, Vulcan XC-72 made by Cabot, EC600JD made by Lion, and EC300 made by Lion may be mentioned. When using these to form a fuel cell catalyst layer, a carbon material supporting catalyst metal particles and an electrolyte resin are made to disperse in ethanol or water or another suitable solvent, then the obtained dispersion is coated on a Teflon® sheet or other base material and dried to prepare a catalyst layer. In this catalyst layer, spaces derived from the tree-branch shaped structures of the supporting carbon material and other 3D structures are formed. Furthermore, parts of the carbon material having a 3D structure entangle to form a tree-branch shaped network.

As explained by the above-mentioned principle of power generation, in a solid polymer fuel cell, proton conduction, electron conduction, and flow and diffusion of reaction gas (anode side: hydrogen, cathode side: oxygen) are essential for smooth progression of the oxidation reaction and reduction reaction to generate power. Specifically, unless the gas diffusion paths enabling oxygen gas or hydrogen gas to move from the gas channels of the separators to the catalyst metal particles at the insides of the catalyst layers of the cathode or anode, proton conduction paths enabling conduction of protons ($H^+$) generated on the catalyst metal particles of the anode side to be conducted through a proton conductive electrolyte membrane to the catalyst metal particles at the cathode side, and electron conduction paths enabling conduction of electrons ($e^-$) generated on the catalyst metal particles of the anode side through the gas diffusion layer, separator, and external circuit to the catalyst metal particles of the cathode side are respectively connected in series without break, it is not possible to efficiently take out current.

Therefore, inside the catalyst layer, in general, it is important that the pores forming the diffusion paths of the oxygen gas or hydrogen gas formed at the spaces of the composite material, the electrolyte material forming the proton conduction paths, and the carbon materials or metal materials for separator use and other conductive materials forming the electron conduction paths form respective connected networks.

Further, as the polymer electrolyte material for the proton conduction path in the proton conductive electrolyte membrane or catalyst layer, an ion exchanged resin such as a perfluorosulfonic acid polymer is used. However, in these generally used polymer electrolyte materials, proton hopping through water molecules is the mode of conduction, so high proton conductivity is first expressed in a moist environment, while in a dry environment, the proton conductivity ends up falling. Therefore, to operate a fuel cell so that no loss of output voltage occurs, it is essential that the polymer electrolyte material be in a sufficiently moistened state. Therefore, it is necessary to constantly supply water vapor together with the gas supplied to the cathode and anode electrodes so as to moisten the polymer electrolyte material.

In this regard, the output voltage of the solid polymer fuel cell is at the highest 1V or so in open circuit voltage due to the various overvoltages. If the cathode is this potential or less, it is possible to substantially ignore the oxidation of the carbon material used as the catalyst support and consumption as $CO_2$ gas (deterioration of supporting carbon material). However, under actual operating conditions, for example, at the time of starting up or stopping the fuel cell etc., the voltage sometimes rises to 1.3V or more. That is, if mixing hydrogen and oxygen in the anode electrode, a hydrogen oxidation reaction in which the hydrogen is oxidized and an oxygen reduction reduction in which the oxygen is reduced occur inside this anode electrode and a local battery is formed. The potential of the part inside the anode electrode at which the oxygen reduction reaction occurs becomes an oxygen reduction potential (about 1V), so the potential of the counter electrode facing it across the electrolyte rises to the potential of the oxygen reduction potential in the node plus the the battery voltage and the potential of the cathode is observed to rise to 1.3V or more, in some cases, 1.5V or more. Such mixing of the hydrogen and oxygen at the anode electrode occurs due to the oxygen of the cathode electrode passing through the solid polymer electrolyte membrane and reaching the anode electrode. This phenomenon is in principle unavoidable so long as using a fluorine-based membrane with an oxygen permeability—both for energy farms and other stationary applications and further for applications for fuel cell vehicles (NPLT 1).

If the high potential of the cathode causes oxidation of the supporting carbon material expressed by the reaction of $C+O_2 \rightarrow CO_2$ and the supporting carbon material deteriorates and is consumed, the catalyst metal particles detach from the support and the amount of catalyst effectively functioning decreases so the power generation performance falls. Alternatively, consumption of the support causes the catalyst layer to become thinner and collapse of the pores causes feed of gas to be obstructed. Due to this, again, the power generation performance falls. Further, the high potential oxidation of the catalyst metal comprised of the platinum also causes deactivation of the catalyst metal etc., so again the power generation performance falls. Therefore, in an actual usage environment, the cell is repeatedly started and stopped. Each time, the cathode is exposed to a 1.3V or more voltage. If this is repeated over a long period of time, the consumption of the supporting carbon material causes an increased drop in the power generation performance corresponding to the number of times of such potential fluctuation.

Therefore, in the past as well, to eliminate the problems due to such deterioration of the supporting carbon material, use of a support comprised of a metal oxide or metal nitride with a high oxidative consumption resistance has been studied (NPLT 2). However, a metal oxide and metal nitride are generally high in water affinity. If using one as a support to form a catalyst layer, since this support and both the catalyst metal and proton conducting resin forming the catalyst layer have affinity with water, the catalyst layer becomes high in water affinity. As a result, the so-called "flooding" phenomenon where the water vapor generated in the cathode side reduction reaction condenses in the electrodes occurs and a large current can no longer be taken out, so this is not suitable for use as a power source. Further, a metal oxide and metal nitride are poor in electron conductivity inside substances. Further, the contact resistance is also high, so a catalyst layer comprised of a catalyst using these as supports becomes higher in electrical resistance, the voltage loss becomes greater, and it becomes difficult to take out a large current. From this viewpoint as well, this is not suited for practical use.

Further, for the purpose of preventing the contamination of the anode electrode by oxygen, suppression of the oxygen permeability of the solid electrolyte membrane is also being studied (PLT 1). A polyimide other than a fluorine-based membrane having a high chemical stability and having a high mechanical strength even if made thinner has been improved in performance until exhibiting a performance in proton conductivity equal to that of a fluorine-based membrane. However, no solution to the basic issue of the problem of the chemical stability is yet in sight at the present time. The long term operating durability has not yet reached the practical level. In a fluorine-based membrane as well, a composite membrane using a nonproton conductive porous membrane having a high mechanical strength as a matrix and impregnating the pores with a proton conducting resin has been studied. However, there is a tradeoff between the mechanical strength and proton conductivity. No practical solution has yet been obtained at the present time.

At the present point of time, the most effective approach has been study to raise the carbon material in oxidative consumption resistance. The oxidative consumption of the carbon material is a reaction in which the carbon at the end parts of the condensed polycyclic aromatic skeleton (below, called "graphene") (below, called "edge carbon") is oxidized and consumed as $CO_2$. Therefore, decreasing the edge carbon leads directly to suppression of oxidative consumption at the carbon material. Specifically, if using a highly crystallized carbon material, that is, a carbon material with large graphene growth, it is possible to suppress the oxidative consumption. In general, it is known that graphene grows and develops at 2000° C. or more and, further, graphene becomes stacked highly orderly at 2400° C. or more. Therefore, up to now, application of a carbon material heat treated at 2000° C. or more in temperature to the catalyst supporting carbon material so as to obtain a catalyst improved in oxidative consumption resistance has been studied (NPLT 3). Further, use of the easily graphitizable carbon material of meso synthetic graphite for a catalyst support has been studied. Specifically, the carbon starting material is heat treated in an inert atmosphere at a 2000° C. or more high temperature (PLT 1).

On the other hand, PLT 2 proposes a carbon material having a basic skeleton of graphene formed and grown in a high temperature environment at the time of an explosive reaction caused by heat treating silver acetylide used as a starting material. In the process of the explosive reaction of this silver acetylide, graphene is produced at a high temperature in a short time, so a carbon material comprised of graphene with even sizes of several nm or so and with few defects can be obtained. This carbon material is provided with the oxidative consumption resistance sought from the supporting carbon material of the fuel cell from the viewpoint that the graphene size is an even nm size and, since acetylide is the starting material, the rate of formation of graphene is high, the amount of amorphous carbon is small, and the amount of edge carbon is small. Further, this carbon material is comprised of graphene, as a source of carbon, produced and grown by an explosive reaction using silver acetylide as a starting material, so basically the formed carbon material does not contain oxygen or hydrogen. For this reason, this carbon material differs from usual carbon material in that there is no edge carbon at the ends of the hydrogen forming the starting points of oxidative consumption or edge carbon to which oxygen-containing functional groups are added. From this viewpoint as well, it is anticipated that a high oxidative consumption resistance can be obtained.

If explaining the problem of flooding more specifically, at the cathode side catalyst layer, not only water molecules moving from the anode side accompanied with the protons, but also water molecules produced by the cathode side reduction reaction become added as water vapor, so the saturated steam pressure is exceeded and these condense to water. Further, the water produced by this reduction reaction becomes greater in amount at the time of large current discharge and pools in the pores at the catalyst layer serving as both the path for gas diffusion and drainage of the produced water and thereby causes clogging. There is therefore the problem that the supply and diffusion of gas to the inside of the catalyst layer become insufficient and the fuel cell falls in voltage. Further, this problem of flooding becomes a major issue at the time of commercialization in applications such as fuel cell vehicles where increase of the output voltage at the time of large current discharge for raising the maximum output is sought.

In this regard, to improve the power generation performance at the time of large current discharge (large current characteristic), it is possible to increase the speed of diffusion of the reaction gas comprised of the oxygen gas and to quickly discharge the water generated by the reduction reaction at the cathode side from the catalyst layer to prevent flooding.

Further, the former approach of increasing the gas diffusion speed more specifically comprises decreasing as much as possible the restriction on speed in the diffusion step until the reaction gas introduced into the catalyst layer reaches the catalyst metal particles. Specifically, the pores in the catalyst layer derived from the tree-branch shaped structures and other forms of the supporting carbon material and the pore structures inside the supporting carbon material in which the catalyst metal particles are present are made larger to an extent no longer restricting the speed of diffusion.

If it were possible to improve the diffusion ability of reaction gas in the catalyst layer and around the catalyst particles in this way, it would become possible to maintain sufficient activity even in a larger current region consuming a large amount of reaction gas and as a result it would become possible to form a fuel cell excellent in large current characteristic.

Further, for the latter approach of quickly discharging the produced water and the former approach of reducing the restriction on speed of diffusion of gas, it is necessary to make the supporting carbon material support the catalyst metal particles in a "highly dispersed state". Here, the "highly dispersed state" is the state where catalyst metal particles are dispersed on the supporting carbon material by a certain distance and so as not to be separated more than necessary so as to enable diffusion of oxygen gas and drainage of water. If spatial distribution of catalyst metal particles in the catalyst layer becomes sparse, the amount of production of water per unit volume in the catalyst layer can be decreased and flooding can be suppressed and the speed of consumption of oxygen per unit volume in the catalyst layer becomes smaller and the regulation of the diffusion of gas becomes difficult.

Furthermore, the ease of flooding differs depending on the pore structure of the supporting carbon material. That is, the more the insides of the pores repel water and the smaller the pore size, the easier the flooding.

Therefore, to improve the gas diffusion ability, it is considered necessary to obtain a tree-branch shaped network and a structure having spaces formed among a large number of branches. Up to here as well, the following specific techniques for improvement and supporting a carbon material have been proposed.

PLT 2 discloses, as a supporting carbon material with a large specific surface area of pores of a nanometer size, that is, mesopores, a supporting carbon material obtained by the method of production shown below. That is, it blows acetylene gas into a solution containing a metal or metal salt to form a metal acetylide and heats the obtained metal acetylide in a vacuum to prepare a metal particle-containing intermediate in which metal particles are contained. Furthermore, it discloses heating this metal particle-containing intermediate in vacuum to make the metal particle-containing intermediate eject metal particles, washing the obtained carbon material intermediate, then heating the washed carbon material intermediate in a vacuum or in an inert gas atmosphere to produce a tree-branch shaped carbon nanostructure comprised of rod-shaped members or ring shaped members containing carbon which are branched outward (supporting carbon material).

PLT 3 proposes a carbon fiber catalyst layer containing, as means enabling improvement of the gas diffusion ability and suppression of flooding, a catalyst comprised of a carbon support on which platinum is supported, carbon fiber with an average fiber diameter of 5 to 20 μm, and a fluorine-containing ion exchange resin and and having a ratio of carbon fiber in the total of the carbon fiber and carbon support (100 mass %) of 60 to 85 mass %.

PLT 4 proposes forming a tree-branch shaped network and spaces between the branches and improving the gas diffusion ability by carbon black having a DBP oil absorption of 170 to 300 $cm^3$/100 g, a specific surface area by the BET method of 250 to 400 $m^2$/g, a primary particle size of 10 to 17 nm, and a total volume of pores opening at the surface with a radius of 10 to 30 nm of 0.40 to 2.0 $cm^3$/g.

CITATION LIST

Nonpatent Literature

NPLT 1. *AIST TODAY*, vol. 9, (2009), No. 08, "Approach to Problems in Soon to be Commercialized Solid Polymer Fuel Cells"

NPLT 2. *Electrochimca Acta*, vol. 77 (No. 30), 2012, pp. 279-284

NPLT 3. Journal of Electroanalytical Chemistry, vol. 688, 2013, pp. 137-142

Patent Literature

PLT 1. Japanese Patent Publication No. 2007-141588A
PLT 2. International Publication No. 2009/075264A
PLT 3. Japanese Patent Publication No. 2010-146965A
PLT 4. Japanese Patent Publication No. 2003-201417A

SUMMARY OF INVENTION

Technical Problem

In PLT 1, to perform graphitization to increase the graphite structure of a carbon material, the carbon material is heat treated at a high temperature over 2000° C., but along with this, the specific surface area of the carbon material becomes smaller and the supporting performance of the catalyst metal particles ends up falling. Specifically, the problem arises that the catalyst metal particles can move more easily on the support, the catalyst metal particles coarsen due to aggregation of the catalyst metal particles, the effective specific surface area involved in the reaction falls, and the output voltage falls. Further, such graphitization decreases the oxygen-containing functional groups and end hydrogen and other polar groups for expressing water affinity and raises the water repellency of the carbon material, so causes a drop in the water affinity and water retention of the catalyst layer. If, as a result, water retention of the catalyst layer falls, in particular at the time of operation under low moistening conditions, the proton conducting resin will not become sufficiently moistened, the proton conduction resistance will rise, and a drop in the power generation performance will be invited.

Further, the inventors etc. investigated the fuel cell characteristics of a catalyst using the carbon material obtained in PLT 2 as a support, whereupon they found the large current characteristic and other aspects of the power generation performance became equal to those of the commercially available ketchen black. Further, the drop in power generation performance with respect to fluctuations in potential of the cathode of over 1V, for example, between 1.3V and 0.6V, is also equal to that of the commercially available ketchen black. If envisioning application to a fuel cell vehicle etc., the durability with respect to potential fluctuation (oxidative consumption resistance) is still insufficient. Further, it was learned that if the amount of fluctuation is greater than the above voltage fluctuation, the durability is low and practical use cannot be withstood.

Therefore, the inventors etc. further studied the problems in use of the carbon material of this PLT 2 as the support for a catalyst. To make this supporting carbon material support catalyst metal particles and use the obtained catalyst metal particle-supporting carbon material to prepare a catalyst layer, pores were formed derived from the tree-branch shaped structure of the supporting carbon material. Further, the supporting carbon material had a specific surface area necessary and sufficient for supporting the catalyst metal particles in a highly dispersed state and had a number of sites sufficient for immobilizing the metal catalyst particles. For this reason, the inventors etc. determined that this supporting carbon material can exhibit a large current characteristic and other excellent power generation performance, but conversely that the edge carbon was too great, the oxidative consumption accompanying potential fluctuation became remarkable, and there were problems in durability.

Further, according to the studies of the inventors etc., even in a catalyst using a support comprised of conductive grade commercially available carbon black such as ketchen black, a large drop in current performance due to flooding and other closure of pores of the catalyst layer or a drop in performance due to the catalyst metal particles not being supported at the supporting carbon material in a highly dispersed state, etc. were seen. Therefore, it was learned that a supporting carbon material simultaneously satisfying the requirements of having a specific surface area necessary and sufficient for making the supporting carbon material support the catalyst metal particles in a highly dispersed state and of the supporting carbon material having a suitable amount of sites enabling the catalyst metal particles to be fixed in a highly dispersed state has not been known up to now.

Further, it may also be considered to apply the art of graphitization of PLT 1 to the carbon material of PLT 2 to improve the oxidative consumption resistance insufficient in the carbon material of PLT 2. However, with just graphitization at a high temperature, even if raising the crystallinity to improve the durability against oxidative consumption, the function as a support for supporting catalyst metal particles (supporting ability) simultaneously falls and the inherent high level of power generation performance possessed by this carbon material ends up becoming impaired.

Therefore, the inventors etc. decided to study what kind of characteristics are required as a supporting carbon material of a solid polymer fuel cell and to develop a material satisfying the following characteristics (a), (b), and (c).

(a) Having a tree-branch shaped structure or other 3D structure for the purpose of improving the large current characteristic and forming pores in the catalyst layer for suppressing flooding (b) Having pores of 1 to 100 nm or so for the purpose of obtaining sufficient sites for supporting catalyst metal particles: In particular, the pores suitable for supporting the above catalyst metal particles in a highly dispersed state having a certain distance from each other are mesopores. Therefore, to achieve this object, it is necessary to develop a porous carbon material with a large specific surface area of the mesopores. Here, a "mesopore" is a pore of a diameter of 2 nm to 50 nm in accordance with IUPAC. To measure the pore diameter, it is possible to employ measurement of the so-called adsorption isotherm of nitrogen gas. Further, for this analysis, for example, it is possible to employ the Dollimore-Heal method.

(c) Having a suitable amount of edge carbon for the purpose of suppressing the oxidative consumption of the supporting carbon material accompanying the above-mentioned potential fluctuation: Here, "suitable amount of edge carbon" means finding the optimum value of the amount of edge carbon. To improve the oxidative consumption resistance of the supporting carbon material, it is necessary that there be little edge carbon. On the other hand, to raise the performance of supporting catalyst metal particles in the supporting carbon material, it is desireable that there be a lot of edge carbon having an adsorption function. Therefore, achievement of both of the contradictory functions sought from a supporting carbon material in relation to the amount of edge carbon, that is, the oxidative consumption resistance and the adsorption and fixing of catalyst metal particles, is being sought.

Further, the inventors etc. further studied conventional carbon materials from the viewpoint of the above characteristics (a), (b), and (c) and as a result discovered that the carbon material of PLT 2 already achieves the characteristics (a) and (b) and that only achievement of (c) is an issue. Further, they discovered that this carbon material is a material which has a thickness and length of branches of about 100 nm or so, further also has a specific surface area of a BET value of 1000 $m^2/g$ or more, and therefore promises the above-mentioned characteristics (a) and (b) of at least the level of the current world standard of ketchen black (thickness and length of branches: 30 to 50 nm or so, BET specific surface area: 800 to 1300 $m^2/g$). Therefore, the inventors etc. thought that if optimizing the amount of edge carbon serving as starting points for oxidative consumption for the carbon material of PLT 2, a supporting carbon material could be obtained with a better power generation than even ketchen black such as a higher output voltage and larger current characteristics and with a smaller oxidative consumption.

Furthermore, based on the above guidelines, the inventors etc. studied the relationship between the amount of edge carbon and the oxidative consumption resistance, the relationship between the pore structure and power generation performance, etc. As a result, they found that as physical indicators expressing the amount of edge carbon quantitatively, the so-called G-band and G'-band in Raman spectroscopy are important and, specifically, the intensity ratio of the G-band and G'-band and the G'-band peak position have strong correlative relationships with the oxidative consumption resistance. Further, they found that the specific surface area of only mesopores (diameter 2 to 50 nm) excluding micropores has a strong correlative relationship with the power generation performance. Furthermore, they discovered that the carbon material of PLT 2 has pores with a high ratio of mesopores and that even if heat treating it at a high temperature of near 2200° C., there is little change in structure of the graphene and little decrease in the pores as well. Further, they found that to achieve both the mutually contradictory functions sought from a supporting carbon material relating to the amount of edge carbon (oxidative consumption resistance and catalyst supporting performance), it is necessary that the pore walls be formed by graphene with few stacked layers and that to support catalyst metal particles of several nanometers in size, so-called mesopores with a size of pores of 2 to 50 nm are optimal, and thereby completed the present invention.

Therefore, an object of the present invention is to provide a supporting carbon material and a catalyst metal particle-supporting carbon material suitable for producing a solid polymer fuel cell not only high in output voltage and enabling large current power generation and otherwise excellent in power generation performance, but also excellent in oxidative consumption resistance and low in drop in power generation performance due to the repeated load fluctuations of a cell which unavoidably occur at the time of operation.

The inventors etc. took note of and studied the relationship between the gas diffusion ability in a catalyst layer and the power generation performance at the time of large current discharge (large current characteristics) so as to further improve the performance of a solid polymer fuel cell. As explained above, the "gas diffusion ability" in a catalyst layer indicates the sum of two diffusions of the oxygen and hydrogen serving as the reaction starting materials in a fuel cell and diffusing through the catalyst layer to reach the surface of the supporting carbon material and further, from there, diffusing through the pores of the supporting carbon material to reach the catalyst metal particles supported in the pores. By this gas diffusion ability becoming better, it is possible to suppress the drop in voltage due to the insufficient starting materials and, further, possible to easily discharge the water produced due to driving the fuel cell.

As a result, the inventors etc. obtained the following findings regarding the characteristics sought from the supporting carbon material:
(A) When preparing the catalyst layer, the pores formed in the catalyst layer be of a size required for gas diffusion
(B) The supporting carbon material be a porous carbon material having pores inside it and the pores have a pore size enabling the gas diffusion in the pores to become sufficiently faster
(C) The supporting carbon material be supported in a highly dispersed state where the catalyst metal particles have a certain distance from each other when supporting catalyst metal particles
(D) The supporting carbon material be a porous carbon material having pores inside it and not having a large number of pores which can easily hold water Specifically, the characteristic (A) is achieved by the shape of the supporting carbon material being made a tree-branch shaped structure with branches and being made suitably thick in the branches. That is, in the catalyst layer formed by aggregation of such a supporting carbon material with an electrolyte resin (proton conducting resin), pores of an extent of at least the thickness of the branches of the supporting carbon material are formed.

Further, the characteristic (B) demands that the reaction gas can be diffused by a sufficient speed under the catalyst metal particles when the catalyst metal particles are supported inside the pores of the supporting carbon material. Specifically, the pore size is a size of the catalyst metal particles or more. Further, to realize a speed of gas diffusion for taking out a large current, a lower limit is prescribed for this pore size.

Furthermore, the characteristic (C) corresponds to increasing the area enabling support of the catalyst metal particles. In other words, this corresponds to increasing the area of pores larger than the size of the catalyst metal particles, specifically, the specific surface area of pores of a nanometer size, that is, mesopores.

Further, the characteristic (D) corresponds to the small amount of produced water not filling the inside of the pores of the supporting carbon material.

Specifically, it is demanded that there be no micropores smaller than the size of the catalyst metal particles or that the volume of them be relatively small compared with the volume of pores having a size of mesopores or more.

Here, the characteristic (A) corresponds to optimization of the above condition (a). Further, the characteristics (B) and (C) and of (D) correspond to optimization of the above condition (b). To satisfy these simultaneously, (B) and (D) define pores of a size larger than the particles of the catalyst metal, while (C) defines pores of a size larger than the catalyst metal particles and a large surface area. That is, the optimum pore structure is one of the minimum size of pores required for gas diffusion and the largest possible surface area of the pores with uniform pore sizes.

Therefore, to provide a solid polymer fuel cell exhibiting an excellent power generation performance under the operating conditions of a fuel cell at the time of large current discharge, it is essential to achieve the above characteristics (A), (B), (C), and (D).

In this regard, in PLT 3, as the means for improving the gas diffusion ability, carbon fiber of a diameter of 5 to 20 μm is added to the catalyst layer. However, to obtain a high power generation performance at the time of large current discharge, it is necessary that not only the gas diffusion ability in the catalyst layer be excellent, but also the gas diffusion ability near the catalyst metal particles be excellent. With the method of adding carbon fiber of several tens of times the size of the submicron size catalyst metal particle-supporting carbon catalyst of PLT 3, it becomes substantially impossible to improve the gas diffusion ability evenly near all of the catalyst metal particles.

Further, for the supporting carbon material obtained by PLT 2, as explained above, it was confirmed that a performance substantially equal to that of the commercially available Pt-supporting catalyst using ketchen black as a supporting carbon material (made by Ishifuku Metal Industry) was exhibited. Further, it was confirmed that this supporting carbon material has a specific surface area equal to that of conventional ketchen black and has a surface area sufficient for supporting catalyst metal particles in a highly dispersed state. Furthermore, it was confirmed that this supporting carbon material is comprised of carbon particles of a tree-branch shaped structure having branches of thicknesses and lengths of about 100 nm.

As previously explained, a carbon material such as carbon black has a structure having pores formed by an aggregate and agglomerate in the catalyst layer of a fuel cell. The supporting carbon material obtained in the above PLT 2 has a tree-branch shaped structure of a thickness and length of branches of several times those of ketchen black. Therefore, the size of the pores formed in the catalyst layer also becomes a size of several times that of ketchen black. Looking at the gas diffusion ability in the catalyst layer, it is believed that this has a performance of ketchen black or more.

However, the power generation performance at the time of large current discharge (large current characteristic) is equal to that of ketchen black. The inventors etc. studied the cause for this and as a result believe that the cause lies in the pore structure present inside the supporting carbon material and that the diffusion of gas near the catalyst metal particles present inside the pores becomes a factor limiting speed and prevents improvement of the large current characteristic.

Therefore, the inventors etc. worked to develop a supporting carbon material satisfying the above conditions (d) and (e) in addition to the above (a), (b), and (c) based on the above results of study.

(d) The thickness and length of the branches of the 3D tree-branch shaped structure be made suitably larger and the pores in the catalyst layer be made larger for the purpose of raising the diffusion ability of the gas flowing through the catalyst layer. Here, as an indicator expressing the thickness and length of branches in an average and quantitative manner, the "outside surface area (area of particle surface not including inside wall surfaces of pores)" is introduced. This outside surface area is used as a physical property defining the material. FIG. 1 are conceptual views of the outside surface area (FIG. 1A: surface area and FIG. 1B: outside surface area). As shown in FIG. 1, the surface area (FIG. 1A) is the total area of a particle surface including the inner wall surfaces of the pores. The specific surface area is the value of this surface area (a) divided by the weight of the carbon. On the other hand, the outside surface area is the area of the particle surface not including the inner wall surfaces of the pores.

(e) For the purpose of making it harder for the catalyst layer to hold the produced water and suppressing flooding, a supporting carbon material be developed with a pore area of pores of a size of 2 nm or less, where once water is held, it is hard to discharge, made smaller than a certain upper limit value.

Here, the "outside surface area" was made the value obtained as the area of pores of a pore size (diameter) of 10 to 50 nm analyzed by the Dollimore-Heal method. The diameter of the pores formed inside the supporting carbon material is substantially less than 10 nm and the thickness of branches may be considerably smaller compared with several 10s to 100s of nm. Therefore, it can be guessed that the specific surface area of mesopores of 10 nm or more expresses the area of the outside surface of the carbon material excluding the pores at the inside of the supporting carbon material. That is, the outside surface area of a pore size of 10 to 50 nm can be used as an indicator of the size of the length of the branches or arms of the average carbon material. The smaller the outside surface area, the larger the size of the skeleton of the carbon material (thickness and length of branches of tree-branch shaped structure) expressed, while conversely the larger the outside surface area, the smaller the skeleton size expressed.

As the specific supporting carbon material for achieving both the above conditions (d) and (e), the inventors etc. studied a carbon material improved over the carbon material of PLT 2 and satisfying the conditions (a), (b), and (c).

Based on the above guidelines, the inventors etc. engaged in intensive studies on the power generation performance of a fuel cell at the time of large current discharge and the pore size of the supporting carbon material and as a result obtained the following discoveries. That is, they found that to improve the large current characteristic, not only the magnitude of the surface area, but also the pore distribution is important and that, specifically, there is a strong correlation between pores of the region of 2 to 50 nm, called "mesopores", and the large current characteristic. The inventors etc. engaged in further studies and as a result discovered that there is a particularly strong correlation, even among mesopores, between the specific pore volume and specific pore area of pores of 2 nm to less than 10 nm, the specific pore area of pores of 10 nm to 50 nm, and, furthermore, the specific pore volume of pores of less than 2 nm and thereby completed the present invention.

Therefore, an object of the present invention, in addition to the above-mentioned object, is to provide a supporting carbon material for a solid polymer fuel cell used for producing a solid polymer fuel cell able to exhibit excellent power generation characteristics in the operating environment at the time of large current discharge. Further, it is to provide a catalyst metal particle-supporting carbon material comprised of this supporting carbon material at which catalyst metal particles are supported.

As explained above, the "durability of the supporting carbon material" is the property showing the oxidative consumption of a supporting carbon material caused in an environment driving a fuel cell. If this oxidative consumption is large, the supporting carbon material is decreased and the catalyst falls off—leading to a drop in the active area. Therefore, the lower the oxidative consumption, the better able it is to provide a fuel cell with a power generation ability which will not fall over a longer period of time from the start of use even if continuously driving the fuel cell.

Therefore, the inventors etc. focused on and studied the relationship between the gas diffusion ability in the catalyst layer and the durability of the supporting carbon material (oxidative consumption resistance) so as to further raise the durability of the supporting carbon material. As a result, they obtained the following discoveries relating to the characteristics demanded from the supporting carbon material.

(E) Due to the tree-branch shaped network which the carbon material forms, a catalyst layer having a large number of spaces is formed and the gas diffusion ability in the catalyst layer becomes good.

(F) The area supporting the catalyst metal particles is large, so a catalyst layer supporting the catalyst metal particles in a "highly dispersed state" is formed, the speed of consumption of oxygen per unit volume in the catalyst layer becomes small, and the diffusion of the gas becomes less likely to be restricted.

(G) The carbon material is high in crystallinity, so the oxidative consumption is suppressed and even if the fuel cell is continuously driven, the structure of the catalyst layer is maintained.

Here, as explained above, to improve the gas diffusion ability in the catalyst layer, it becomes necessary to both form a catalyst layer having a large number of spaces and to support the catalyst metal particles on the supporting carbon material in a "highly dispersed state". Further, to form a catalyst layer having a large number of spaces, growth of the carbon material into a tree-branch shaped network is necessary. Further, to support the catalyst metal particles in a "highly dispersed state", the supporting surface area has to be large.

In this, the extent of the "tree-branch shaped network" can be judged by the DBP oil absorption, through there is also the method of using an electron microscope to observe and determine it. The above-mentioned "outside surface area" is an indicator relating to the "thickness of branches" and "length of branches" of the supporting carbon material. On the other hand, the DBP oil absorption is an indicator for directly evaluating the spaces which can be formed when inseparable units of the tree-branch shaped structure aggregate. Further, this directly corresponds to the pores formed in the catalyst layer. That is, the "DBP oil absorption" is an indicator for evaluating the tree-branch shaped network, that is, aggregate, of the carbon material. The specific measurement method is to knead a predetermined amount of the dried carbon material while dropping dibutyl phthalate (DBP) and investigating the relationship between the dropped amount and kneading torque. That is, the total amount of DBP dropped when the carbon material is wet by DBP, all of the powder particles contact by DBP, and the kneading torque rises is defined as the "DBP oil absorption". This DBP oil absorption corresponds to the average value of the amount of fluid which can hold one particle of powder when powder particles aggregate. The actual spaces in which the DBP solution is contained, as shown in FIG. 2, include the spaces formed by single particles of carbon themselves (space $S_1$ inside particles) (FIG. 2A) and the spaces formed with other carbon (space $S_2$ between particles) (FIG. 2B). The larger the spaces, the more DBP liquid is absorbed. This shows that if the DBP oil absorption becomes larger, the spaces shown in FIG. 2 are large. This corresponds to formation of the tree-branch shaped network of the carbon material. It means that if using a carbon material having such a large DBP oil absorption as the catalyst support and preparing a catalyst to form the catalyst layer, a large number of spaces in which the DBP solution enters is formed in the formed catalyst layer Therefore, such spaces become paths for passage of the gas. The smaller the amount of the starting material gas, the more it is possible to avoid a situation where the reaction becomes obstructed. That is, it becomes possible to form a fuel cell with a good large current characteristic.

In this regard, PLT 4 uses the DBP oil absorption as an indicator to try to improve the gas diffusion ability, but the specific surface area is small, so the diffusion ability of the catalyst metal becomes poor and the fuel cell characteristics tend to fall.

Further, to make the supporting carbon material support the catalyst metal particles in a "highly dispersed state", it becomes necessary to increase the area which can support the catalyst metal particles. For this reason, it becomes necessary to increase the BET specific surface area. Here, the "BET specific surface area" is the value of the specific surface area found by the BET method from measurement of the adsorption isotherm of nitrogen gas at the liquid nitrogen temperature. That is, the BET specific surface area shows the area at which catalyst metal particles can be physically adsorbed. The broader the area, the more easily it is for the distance from the catalyst metal particles present adjoining it to become larger and the more possible it becomes for the particles to be supported in a "highly dispersed state".

On the other hand, as one of the factors determining the durability under a fuel cell usage environment, the crystallinity of the supporting carbon material may be mentioned.

In a supporting carbon material, carbon atoms form a beehive-like hexagonal (graphene) network to thereby form a 2D sheet. The crystallinity of the supporting carbon material is determined by the size of the 2D sheet and the presence of any stacked structures of the sheets. Specifically, it is known that if a sheet spread in the planar direction or a plurality of sheets are stacked, the crystallinity becomes higher. If using such a high crystallinity carbon material as a support for a fuel cell, it is known that the oxidative consumption of the carbon material due to driving of the fuel cell is suppressed and the durability becomes higher. Under the conditions of use of the fuel cell, the oxidative reaction occurs from the weak parts of the carbon material, specifically the end faces of the sheets etc. If the reaction continuously proceeds, the carbon material becomes consumed. However, in high crystallinity carbon material, there are few such reaction locations, so the oxidative consumption of the carbon itself is suppressed.

Further, if the carbon material used as a support is consumed by oxidation, at the reaction sites, aggregation and desorption of platinum occur, the fuel cell characteristics end up greatly falling, and the result ends up becoming different from the initial characteristics. For this reason, to realize a solid polymer fuel cell which can suppress deterioration even with continuous use, it is important to improve the crystallinity of the carbon material used as the catalyst support and suppress deterioration of the support due to oxidative consumption. Note that, to improve the crystallinity of a carbon material, it is known that heat treatment is effective. Further, as an indicator of the crystallinity, in general, the half width ($\Delta G$) of the range of 1550 to 1650 $cm^{-1}$ called the G-band, obtained from the Raman spectrum, is used. It is known that the smaller the value, the higher the crystallinity of the material.

There is in general a tradeoff among these three (E), (F), and (G). In carbon materials up to now, both the gas diffusion ability and durability could not be simultaneously realized. This is due to the fact that if reducing the $\Delta G$ by heat treatment to raise the crystallinity, the DBP oil absorption and BET specific surface area end up falling. Specifically, if performing heat treatment, the composite units of the carbon material, that is, the 2D sheets, are joined with the adjoining 2D sheets and other reactions occur. The composite units become larger and move and are stacked, whereby the crystallinity is improved. Such changes, since the composite units greatly move, end up sealing many of the holes in the carbon material serving as the source of the BET specific surface area and become a cause of a great drop in the BET specific surface area. That is, if performing heat treatment to improve the crystallinity, there is the tradeoff that the BET specific surface area becomes smaller. From this, in general, it is believed that a carbon material able to achieve both a gas diffusion ability and durability is difficult to realize. In fact, there has never been such a carbon material in the past. Further, it had been considered difficult to improve the previously existing carbon materials to prepare a carbon material meeting all of the three conditions (E), (F), and (G).

Therefore, the inventors etc. worked to develop a supporting carbon material satisfying the following three conditions (f) to (h) so as to achieve both of formation of a catalyst layer having a large number of spaces and of support by a supporting carbon material of catalyst metal particles in a "highly dispersed state". Furthermore, they studied the development of a supporting carbon material ensuring durability and meeting the above-mentioned three conditions (E), (F), and (G).
(f) Developing a supporting carbon material with a large BET specific surface area (m$^2$/g) for the purpose of obtaining a surface area sufficient for supporting catalyst metal particles.
(g) Suitably increasing the thickness and length of branches of the 3D tree-branch shaped structure and enlarging the pores in the catalyst layer for the purpose of increasing the gas diffusion ability in the gas flowing through the catalyst layer.
(h) Improving the crystallinity of the carbon material for the purpose of increasing the durability in the usage environment of a fuel cell.

As a specific supporting carbon material meeting the above three conditions (f) to (h), the inventors etc. studied carbon materials improved over the carbon material of PLT 2, that is, a carbon material satisfying the above conditions (a), (b), and (c) or a carbon material satisfying the conditions (a) to (e).

Based on the above guidelines, the inventors etc. studied the fuel cell power generation performance at the time of a large current discharge and the DBP oil absorption, BET specific surface area, and G-band half width ($\Delta$G) of the supporting carbon material. As a result, they found that to develop a carbon material having both durability and a large current characteristic, it is important to increase the concentration of the starting material when preparing a metal acetylide. That is, the inventors etc. discovered that by raising the acetylene concentration in the process of production of this metal acetylide, it is possible to suitably increase the thickness and length of branches of the 3D tree-branch shaped structure and reduce the $\Delta$G without impairing the DBP oil absorption and BET specific surface area and thereby completed the present invention.

Therefore, an object of the present invention, in addition to the above-mentioned objects, is to provide a supporting carbon material for a solid polymer fuel cell which has little drop in voltage even when running a large current when used as a catalyst for a solid polymer fuel cell and, further, suppresses deterioration in long term use and a catalyst for a solid polymer fuel cell using the same.

Solution to Problem

That is, the present invention is configured as follows:
(1) A supporting carbon material for a solid polymer fuel cell comprised of a porous carbon material having a specific surface area $S_A$ of mesopores of a pore size of 2 to 50 nm, found by analyzing a nitrogen adsorption isotherm of an adsorption process by the Dollimore-Heal method, of 600 m$^2$/g to 1600 m$^2$/g, having a relative intensity ratio (IG'/IG) of a peak intensity (IG') of a peak present in the G'-band of 2650 to 2700 cm$^{-1}$ in range at a Raman spectrum and a peak intensity (IG) of a peak present in the G-band of 1550 to 1650 cm$^{-1}$ of 0.8 to 2.2, and having a peak position of the G'-band of 2660 to 2670 cm$^{-1}$.
(2) The supporting carbon material for a solid polymer fuel cell according to (2), wherein in the mesopores, mesopores with a pore size of 2 nm to less than 10 nm have a specific pore area $S_{2-10}$ of 400 m$^2$/g to 1100 m$^2$/g, mesopores with a pore size of 2 nm to less than 10 nm have a specific pore volume $V_{2-10}$ of 0.4 cc/g to 1.6 cc/g, and mesopores with a pore size of 10 nm to 50 nm have a specific pore area $S_{10-50}$ of 20 m$^2$/g to 150 m$^2$/g, and micropores of a pore size of less than 2 nm, found by analyzing a nitrogen adsorption isotherm of an adsorption process by the Horvath-Kawazoe method, have a pore area $S_2$ of 250 m$^2$/g to 550 m$^2$/g.
(3) The supporting carbon material for a solid polymer fuel cell according to (2) wherein the specific pore area $S_{2-10}$ is 400 m$^2$/g to 1000 m$^2$/g, the specific pore volume $V_{2-10}$ is 0.4 cc/g to 1.4 cc/g, the specific pore area $S_{10-50}$ is 30 m$^2$/g to 100 m$^2$/g, and the specific pore area $S_2$ is 300 m$^2$/g to 500 m$^2$/g.
(4) The supporting carbon material for a solid polymer fuel cell according to any one of (1) to (3) wherein a specific surface area $S_{BET}$ by the BET method is 600 m$^2$/g to 1500 m$^2$/g, the DBP oil absorption X is 200 cm$^3$/100 g to 650 cm$^3$/100 g, a ratio (X/$S_{BET}$) of the DBP oil absorption X and the specific surface area $S_{BET}$ is 3 nm to 5 nm, and a half width of a peak present in the range of 1550 to 1650 cm$^{-1}$ called the G-band is 30 cm$^{-1}$ to 75 cm$^{-1}$.
(5) The supporting carbon material for a solid polymer fuel cell according to (4) wherein the specific surface area $S_{BET}$ is 800 m$^2$/g to 1300 m$^2$/g, the DBP oil absorption X is 300 cm$^3$/100 g to 550 cm$^3$/100 g, the ratio (X/$S_{BET}$) of the DBP oil absorption X and the specific surface area $S_{BET}$ is 3 nm to 5 nm, and the half width is 50 cm$^{-1}$ to 70 cm$^{-1}$.
(6) The supporting carbon material for a solid polymer fuel cell according to any one of (1) to (5) wherein the specific surface area $S_A$ is 700 m$^2$/g to 1400 m$^2$/g and a relative intensity ratio (IG'/IG) of the G'-band and G-band is 1.0 to 2.0.
(7) The supporting carbon material for a solid polymer fuel cell according to any one of (1) to (5) wherein the specific surface area $S_A$ is 700 m$^2$/g to 1400 m$^2$/g and a peak position of the G'-band is 2662 to 2668 cm$^{-1}$.
(8) The supporting carbon material for a solid polymer fuel cell according to any one of (1) to (5) wherein the specific surface area $S_A$ is 700 m$^2$/g to 1400 m$^2$/g, a relative intensity ratio (IG'/IG) of the G'-band and G-band is 1.0 to 2.0, and a peak position of the G'-band is 2662 to 2668 cm$^{-1}$.
(9) A catalyst metal particle-supporting carbon material for a solid polymer fuel cell comprised of a supporting carbon material for a solid polymer fuel cell according to any one of (1) to (8) on which platinum alone or mainly platinum catalyst metal particles are supported.

Advantageous Effects of Invention

The supporting carbon material for a solid polymer fuel cell and catalyst metal particle-supporting carbon material of the present invention maintain a high power generation performance while exhibiting excellent durability to fluctuation of potential compared with the conventional commercially available supporting carbon material and catalyst metal particle-supporting carbon material. It is possible to improve the durability, that is, prevent the power generation performance from changing even with repeated voltage fluctuations.

Further, the supporting carbon material for a solid polymer fuel cell of the present invention is a material optimal for producing a solid polymer fuel cell able to exhibit excellent power generation performance in an operating environment of large current discharge. The remarkable effect is exhibited that by using the solid polymer fuel cell obtained using this material, the remarkable effect is exhibited that it is possible to cut the cost of the power generation system as a whole.

Further, according to the present invention, it is possible to provide a supporting carbon material for a solid polymer fuel cell with little voltage drop even if running a large current when used as a catalyst for a solid polymer fuel cell and further able to suppress deterioration in continuous use and to provide a catalyst metal particle-supporting carbon material prepared using the same.

BRIEF DESCRIPTION OF DRAWINGS

FIG. 1 are explanatory views for explaining the concept of the "outside surface area" used as an indicator in the present invention in comparison with the "surface area", wherein FIG. 1A shows the surface area while FIG. 1B shows the outside surface area.

FIG. 2 are schematic views for explaining the tree-branch shaped network in the supporting carbon material of the present invention, wherein FIG. 2A shows the "spaces formed by single carbon particles themselves" while FIG. 2B shows "other spaces formed between carbon particles".

DESCRIPTION OF EMBODIMENTS

Figure 1:
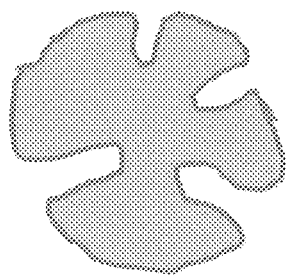
Figure 1:
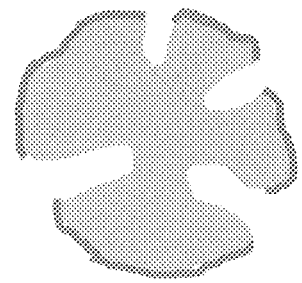

1. Supporting Carbon Material for Solid Polymer Fuel Cell 1-1. Regarding Conditions (a), (b), and (c)

In the supporting carbon material of the present invention, the specific surface area $S_A$ of the mesopores with a pore diameter, determined by measurement of the nitrogen adsorption, of 2 to 50 nm is 600 $m^2/g$ to 1600 $m^2/g$, preferably 700 $m^2/g$ to 1400 $m^2/g$. Micropores do not function to support nanosize catalyst metal particles, so what is important as a support is the area of the walls forming the mesopores with a pore diameter of 2 to 50 nm. Therefore, in the supporting carbon material of the present invention, the specific surface area $S_A$ of mesopores calculated by measurement of the adsorption/desorption of nitrogen gas is made the indicator. If the specific surface area $S_A$ of the mesopores is less than 600 $m^2/g$, it is not possible to support the amount of catalyst metal particles required for fuel cell power generation and the power generation performance falls. Conversely, if over 1600 $m^2/g$, the average pore size becomes smaller, the size of carbon graphene forming the pore walls becomes smaller, and, as a result, the edge carbon increases and the desired oxidative consumption resistance cannot be obtained.

Note that, in the present invention, the specific surface area $S_A$ of mesopores is calculated by analyzing the nitrogen adsorption isotherm of the adsorption process by the Dollimore-Heal method. In general, for analysis of the pore structure, an adsorption isotherm of nitrogen gas at the liquid nitrogen temperature is used (Maruzen, Feb. 25, 2001, Seiichi Kondo et al., "*The Science of Adsorption*"). For analysis of the pore structure of in particular mesopores (pores of diameter 2 to 50 nm) among the pore structures, the Dollimore-Heal method, BJH method, and CI method are known. For the porous carbon material using a metal acetylide as a starting material in the present invention, from the process of production of the pores, it is suitable to envision a cylindrical shape pore structure. Therefore, the inventors used the Dollimore-Heal method to analyze the adsorption isotherm. Here, the program used for the analysis was the software attached to the BELSORP mini made by Bel Japan.

Further, in the supporting carbon material of the present invention, the peak intensity (IG') in the range of the G'-band of 2650 to 2700 $cm^{-1}$ in the Raman spectrum and the peak intensity (IG) in the range of the G-band of 1550 to 1650 $cm^{-1}$ is 0.8 to 2.2 and the peak position of the G'-band is 2660 to 2670 $cm^{-1}$. Preferably, the relative intensity ratio (IG'/IG) of the G'-band and G-band is 1.0 to 2.0, and the peak position of the G'-band is 2662 to 2668 $cm^{-1}$. Note that, the peak intensities (IG and IG') are amounts corresponding to the areas of the peaks. If the relative intensity ratio (IG'/IG) of the G'-band and G-band is smaller than 0.8, the edge carbon becomes too sparse, the support performance of the catalyst metal particles fall, the catalyst metal particles are desorbed, the particles agglomerate with each other etc., and as a result, the power generation performance and the durability fall thereby making this material unsuitable for practical use. Conversely, if the relative intensity ratio (IG'/IG) is larger than 2.2, the edge carbon becomes too numerous and, while the support performance is excellent, the oxidative consumption becomes remarkable and the durability drops thereby also making this unsuitable for practical use. Further, regarding the peak position of the G'-band, the case when smaller than 2650 $cm^{-1}$ corresponds to a single layer of carbon graphene. The pore walls forming the skeleton of the material are weak in strength and the pores easily collapse due to the pulverization step or other external action thereby making impossible to achieve the required specific surface area. Conversely, if larger than 2700 $cm^{-1}$, the number of stacked layers becomes 5 layers or more. In this case as well, the required specific surface area can no longer be achieved. Note that, in the Raman spectrum of the carbon material, the spectrum shape (peak position, relative strength) changes depending on the excitation light energy, but in the present invention, 532 nm excitation light was used.

Here, the size of the graphene forming the pore walls and the number of stacked layers of graphene are prescribed by the peak of the range of 2650 to 2700 $cm^{-1}$ called the G'-band in the Raman spectrum and the peak of the range of 1550 to 1650 $cm^{-1}$ called the G-band. By experimental and theoretical studies, it is proven that the peak position of the G'-band reflects the number of stacked layers of graphene (M. A. Pimenta et. al, *Physical Chemistry Chemical Physics*, vol. 9, 2007, pages 1276-1291). Further, in the present invention, the peak position of the G'-band corresponding to the number of stacked layers of graphene is 2650 to 2700 $cm^{-1}$, preferably 2662 to 2668 $cm^{-1}$. Further, the relative intensity ratio (IG'/IG) of the intensity of the G'-band (IG') in the Raman spectrum and the intensity of the G-band (IG) is an indicator correlated with the amount of edge carbon. The G-band corresponds to the vibration mode of the graphene. The intensity is believed to correspond to the relative mass ratio of graphene contained in a carbon material. Further, in the G'-band, the intensity is strongly correlated with the number of stacked layers. The smaller the number of stacked layers, the stronger the intensity. Further, the larger the number of stacked layers, the smaller the intensity. If the number of stacked layers is constant, the intensity of the G'-band depends on the graphene size. If the graphene size is large, IG' becomes larger, while if the graphene size is small, IG' becomes smaller.

1-2. Regarding Conditions (d) and (e)

In the catalyst supporting carbon material of the present invention, the mesopores of a pore size of 2 to 50 nm are controlled. Specifically, the specific pore area $S_{2-10}$ and specific pore volume $V_{2-10}$ of pores with a pore size of 2 nm to less than 10 nm and the specific pore area $S_{10-50}$ of pores with a pore size of 10 nm to 50 nm are in specific ranges. Furthermore, for micropores of a pore size of less than 2 nm, the particle size of the platinum generally used as a catalyst metal is 1.0 to 6.0 nm. These platinum particles have difficulty entering into the pores, so the magnitude of their amount does not have much of an effect from the viewpoint of supporting the platinum. However, if the amount of micropores is large, since micropores have the property of not easily discharging water once holding it, it becomes difficult to discharge the produced water from the catalyst layer at the time of large current discharge. This causes flooding. Therefore, the specific pore area $S_2$ of the micropores with a pore size of less than 2 nm is also kept within a specific range.

Further, among the mesopores as well, it is believed that an efficient reduction reaction occurs on the catalyst metal particles supported in mesopores with a pore size of 2 nm to less than 10 nm even in fuel cell operating conditions at the time of large current discharge.

In the catalyst supporting carbon material of the present invention, the specific pore area $S_{2-10}$ of pores with a pore size of 2 nm to less than 10 nm is 400 m$^2$/g to 1100 m$^2$/g, preferably 400 m$^2$/g to 1000 m$^2$/g. If the specific pore area $S_{2-10}$ of the mesopores is 400 m$^2$/g to 1100 m$^2$/g, the output performance at the time of large current discharge becomes good. If the specific pore area $S_{2-10}$ is less than 400 m$^2$/g, due to the reasons shown below, it is guessed that the catalyst metal particles can no longer be supported in the mesopores at a high density. Here, a "large current" indicates a current density of at least 1000 mA/cm$^2$ and, furthermore, a current density of 1500 mA/cm$^2$ or more. In order for the platinum particles to efficiently play a role in the catalyst reaction, the reaction gas has to equally diffuse to the platinum particles in the pores. If the platinum particles are closely supported, the adjoining platinum particles will compete over the diffused reaction gas molecules. This is not preferable. On the other hand, improving the diffusion of gas by making the catalyst layer thinner, that is, raising the supporting density of platinum particles, is demanded. To obtain the minimum support density of platinum particles required for taking out a large current in this way, the lower limit of the essential mesopore specific pore area $S_{2-10}$ should be 400 m$^2$/g. Conversely, if this specific pore area $S_{2-10}$ exceeds 1100 m$^2$/g, since the inside of the support only has a limited volume, if the mesopore area becomes larger, the average size of the mesopores will correspondingly become smaller. In this regard, since platinum particles are supported in the pores, to enable gas to easily diffuse through the spaces between the platinum particles and the pores, the pore size is preferably large. The upper limit of balance of the pore size and area is believed to be 1100 m$^2$/g.

Further, in the catalyst supporting carbon material of the present invention, the specific pore volume $V_{2-10}$ of pores with a pore size of 2 nm to less than 10 nm is 0.4 cc/g to 1.6 cc/g, preferably 0.4 cc/g to 1.4 cc/g. If this specific pore volume $V_{2-10}$ is less than 0.4 cc/g, the volume becomes small with respect to the pore area, so the average pore size becomes smaller. When supporting platinum particles in the pores, the spaces between the pores and the platinum particles become smaller, so gas diffusion falls and the large current characteristic ends up falling. Conversely, if the specific pore volume $V_{2-10}$ exceeds 1.6 cc/g, the skeleton used as the carbon support ends up becoming thinner, the oxidative consumption resistance falls, the stirring required when preparing the catalyst layer ink for preparing the catalyst layer causes the skeleton of this carbon support to easily break, and the characteristics derived from the shape can no longer be exhibited.

Furthermore, in the catalyst supporting carbon material of the present invention, the specific pore area $S_{10-50}$ of pores with a pore size of 10 nm to 50 nm is 20 m$^2$/g to 150 m$^2$/g, preferably 40 m$^2$/g to 100 m$^2$/g. If this specific pore area $S_{10-50}$ is less than 20 m$^2$/g, the skeleton size of the carbon material (thickness and length of branches of tree-branch shaped structure) becomes too thick, the number of points of contact between the catalyst-supporting carbon material in the catalyst layer becomes smaller, a drop in the electron conduction efficiency is invited, and the fuel cell performance is made to decline. If this specific pore area $S_{10-50}$ exceeds 150 m$^2$/g, the skeleton size of the carbon material becomes too fine, the spaces between the catalyst particles become smaller, and the gas diffusion ability of the catalyst becomes poor.

Furthermore, in the catalyst supporting carbon material of the present invention, the specific pore area $S_2$ of pores with a pore size of less than 2 nm is 250 m$^2$/g to 550 m$^2$/g, more preferably 300 m$^2$/g to 500 m$^2$/g. If the specific pore area $S_2$ exceeds 550 m$^2$/g, it becomes difficult to discharge the produced water from inside the catalyst layer at the time of large current discharge and flooding is caused. Further, if the specific pore area $S_2$ is not less than 250 m$^2$/g, the amount of moisture stored in the micropores decreases, so the water holding and water affinity of the carbon material drop sharply or is lost, so it becomes difficult to store the moisture required for operation of the fuel cell in the catalyst layer and the output voltage falls.

1-3. Regarding Conditions (f), (g), and (h)

Figure 2:
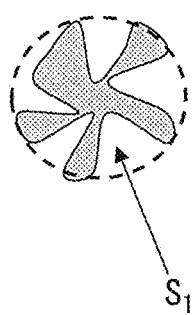
Figure 2:
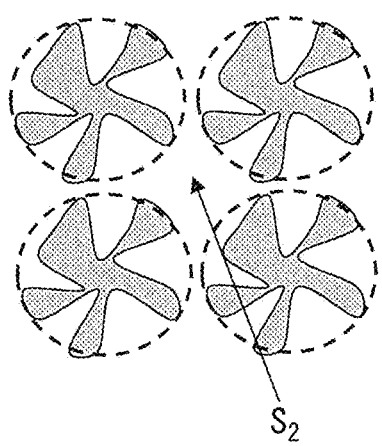

In the supporting carbon material of the present invention, the specific value of the DBP oil absorption is 200 cm$^3$/100 g or more, preferably 300 cm$^3$/100 g or more. If satisfying such a value, excellent electrode characteristics are exhibited. If this DBP oil absorption is less than 200 cm$^3$/100 g, the spaces such as shown in FIG. 2 become insufficient, the paths for the gas become smaller, the speed of gas diffusion cannot keep up with the electrode reaction, and as a result the gas diffusion resistance causes the output voltage to fall. Further, if this DBP oil absorption exceeds 1000 cm$^3$/100 g, the bulk density of the support becomes too low and the thickness of the catalyst layer formed for supporting the basis weight amount (g/m$^2$) of catalyst required for imparting a predetermined power generation ability ends up becoming too great. That is, even if forming the same thicknesses of catalyst layers, the supported amount of catalyst metal particles forming the reaction sites decreases, so the catalyst layer has to be made thicker. Further, if the thickness of the catalyst layer becomes greater in this way, the diffusion distance of the gas ends up becoming longer. As a result, the gas diffusion resistance in the catalyst layer increases and the output voltage ends up falling.

Note that, in the supporting carbon material of the present invention, to make the later explained BET specific surface area and the half width $\Delta G$ of the range of 1550 to 1650 cm$^{-1}$ called the G-band, obtained from the Raman spectrum, suitable ranges, the range of DBP oil absorption which can be substantially utilized is 200 cm$^3$/100 g to 650 cm$^3$/100 g.

On the other hand, in the case of a material with a large BET specific surface area such as the supporting carbon material of the present invention, since the pores running from the particle surfaces to the insides contribute to absorption of liquid, sometimes a DBP oil absorption somewhat larger than the DBP oil absorption corresponding to the holding volume between true particles is observed corresponding to the pore volume. Note that, here, the "BET specific surface area" is the value of the specific surface area found by the BET method from measurement of an adsorption isotherm at the liquid nitrogen temperature. If this value is large, it shows that a large number of nanometer (nm) pores are present in the carbon material. That is, the DBP oil absorption, as a primary approximation, becomes a general indicator with respect to the spaces between particles, but is observed to be greater than the amount of DBP supply corresponding to the holding volume between true particles. Therefore, in the present invention, in addition to this DBP oil absorption, the ratio ($X/S_{BET}$) between the DBP oil absorption X (cm$^3$/100 g) and the BET specific surface area $S_{BET}$ (m$^2$/g) was found and prescribed.

That is, in a porous carbon material having a high tree-branch shaped network, the DBP oil absorption X becomes greater compared with the BET specific surface area $S_{BET}$, while conversely in a material having a low tree-branch shaped network, the DBP oil absorption X becomes smaller compared with the BET specific surface area $S_{BET}$. Therefore, by prescribing this ratio ($X/S_{BET}$), it becomes possible to judge to what extent the effect of the BET specific surface area $S_{BET}$ is felt. Specifically, in a porous carbon material like in the present invention which has a relative large BET specific surface area $S_{BET}$ of 600 m$^2$/g or more, the ratio ($X/S_{BET}$) of the DBP oil absorption X (cm$^3$/100 g) and BET specific surface area $S_{BET}$ (m$^2$/g) is 3 nm to 5 nm. If this ratio ($X/S_{BET}$) exceeds 5 nm, in the porous carbon material, the ratio of pores which cannot form passageways for gas becomes larger and the value of the apparent DBP oil absorption X tends to become higher. However, the spaces shown in FIG. 2 do not greatly change. Further, if less than 3 nm, formation of spaces between the branches cannot be expected, the gas diffusion paths become insufficient, and a sufficient gas diffusion ability cannot be secure.

Further, if the BET specific surface area is 600 m$^2$/g or more, preferably 800 m$^2$/g or more, catalyst metal particles of several nm size are supported in a well dispersed state, that is, a state where the distance between catalyst metal particles is held at a constant value or more and the particles can remain present in an independent state. Conversely, if this BET specific surface area is less than 600 m$^2$/g, the distance between catalyst particles becomes shorter and locations arise where part of the catalyst metal particles are supported contacted in form. As a result, the effective area of the catalyst metal particles fall and the fuel cell characteristics greatly end up falling. Note that, there is no theoretical upper limit this BET specific surface area, but the BET specific surface area of the porous carbon material substantially able to be actually utilized in the present invention is 1500 m$^2$/g or less. In this way, if using a porous carbon material with a BET specific surface area of 600 m$^2$/g or more and making this support the catalyst metal particles, the catalyst metal particles become supported on the supporting carbon material by a certain distance and the spatial districution of the catalyst metal particles in the catalyst layer becomes sparse. As a result, the speed of consumption of oxygen per unit volume in the catalyst layer becomes lower and it becomes possible to suppress a voltage drop due to gas diffusion.

Furthermore, to improve the durability in the environment of use of the fuel cell, the crystallinity of the supporting carbon material is raised. The crystallinity of the supporting carbon material can be evaluated by the half width ($\Delta G$) in the range of 1550 to 1650 cm$^{-1}$, called the G-band, obtained from the Raman spectrum. Specifically, the smaller this G-band half width ($\Delta G$), the higher the crystallinity of the supporting carbon material. Therefore, in the present invention, the G-band half width ($\Delta G$) is controlled to 75 cm$^{-1}$ or less. If the G-band half width ($\Delta G$) is 75 cm$^{-1}$ or less, the durability can be secured in the environment of fuel cell usage. In a carbon material with this G-band half width ($\Delta G$) exceeding 75 cm$^{-1}$, the crystallinity is low, there are many end faces of sheets forming starting points of oxidative consumption, and practical use cannot be withstood. Note that, the lower limit of the $\Delta G$ value is not particularly set, but the $\Delta G$ value of the carbon material which can be substantially utilized in the present invention is 30 cm$^{-1}$ or more.

2. Method of Production of Supporting Carbon Material for Solid Polymer Fuel Cell For the method of producing the supporting carbon material for a solid polymer fuel cell of the present invention meeting the above-mentioned conditions (a) to (c), preferably the following method may be mentioned.

That is, this is a method comprising an acetylide producing step of blowing acetylene gas into a solution containing a metal or metal salt to cause the production of a metal acetylide, a first heat treatment step of heating the metal acetylide to 40 to 80° C. in temperature to prepare a metal particle-containing intermediate containing metal particles, a second heat treatment step of press-forming the metal particle-containing intermediate, heating the obtained shaped articles by a speed of temperature rise of 100° C. per minute or more until 400° C. or more to make the metal particle-containing intermediate eject metal particles to obtain the carbon material intermediate, a washing step of bringing the carbon material intermediate obtained by the second heat treatment step into contact with hot concentrated nitric acid or concentrated sulfuric acid to clean the carbon material intermediate, and a third heat treatment step of heating the carbon material integrident washed in the washing step in vacuo or in an inert gas at an atmosphere of air 1400 to 2100° C. to obtain a supporting carbon material.

In the method of production of this supporting carbon material, the acetylide generating step, the first heat treatment step, and the washing step may for example be similar to the steps in the method described in PLT 2.

As opposed to this, in the second heat treatment step of heating the metal particle-containing intermediate obtained at the first heat treatment step to make this metal particle-containing intermediate eject metal particles to obtain a carbon material intermediate, it is necessary to first press-form the metal particle-containing intermediate, then heat the obtained shaped articles by a speed of temperature rise of 100° C. per minute or more until 400° C. or more.

Here, when press-forming the metal particle-containing intermediate to form the shaped articles, it is preferable to use as high a pressure as possible for the treatment, but the pressing operation itself becomes a trigger causing an explosion, so usually the press-forming is performed at 0.1 kg/cm$^2$ to 10 kg/cm$^2$, preferably 0.5 kg/cm$^2$ to 5 kg/cm$^2$. Further, the size of the shaped articles (pellets) at the time of press-forming is also basically not particularly limited, but to avoid the danger of explosion, the intermediate should be press-formed into relatively small pellets. Usually, it is press-formed into pellets of a weight of 0.1 g to 10 g or so. If the weight of the pellets which are press-formed is less than 0.1 g, in the second heat treatment step, the heat energy when heating the metal particle-containing intermediate press-formed into pellets to make it eject metal particles is small. Due to the heat at this time, it becomes difficult to decrease the amount of edge carbon. This is not suited to the present invention.

Further, in the second heat treatment step, the shaped articles of the metal particle-containing intermediate obtained by press-forming are preferably heated by a 100° C./min or more, preferably 300° C./min or more, speed of temperature rise until 400° C. or more, preferably 400° C. to 600° C., in temperature and made to explode all at once. Due to this, it is possible to realize the desired growth of graphene and decrease of edge carbon in the obtained carbon material intermediate. If the speed of temperature rise at this time is 100° C./min or less or if the heating temperature is less than 400° C., the decrease of the edge carbon becomes insufficient. As a result, it no longer becomes possible to suppress the oxidative consumption of the supporting carbon material due to the fluctuation of potential at the time of fuel cell operation and the durability falls. Further, if the heating temperature exceeds 600° C., the 3D tree-branch shaped structure of the metal acetylide is destroyed, the gas diffusion ability of the catalyst layer due to the tree-branch shaped structure falls, and as a result the power generation output is liable to fall.

Further, in the third heat treatment step of heating the carbon material intermediate cleaned in the above washing step in a vacuum or in an inert gas atmosphere to obtain a supporting carbon material, the intermediate has to be heated at 1400° C. to 2100° C., preferably 1500° C. to 2100° C. in temperature. In this third heat treatment step, the edge carbon is decreased, but it is necessary that the changes in structure be ones where the pore structure is maintained, that is, where there is no large movement of graphene, increase in stacked layers, etc. If the above heating temperature is lower than 1400° C., the edge carbon decreases and the oxidative consumption resistance cannot be improved. Conversely, if over 2100° C., the texture of the graphene changes, the number of stacked layers increases, the pores are crushed, the amount of pores decrease, etc. As a result, the supporting performance of the catalyst metal particles is impaired, the support of the catalyst metal particles becomes uneven, the supported amount decreases, and the function as a catalyst itself falls. In this third heat treatment step, the object is to repair growth of the graphene, that is, merger of graphene, repair defects in the graphene, repair stacking defects of the graphene, etc. As the temperature region for avoiding remarkable growth of graphene and growth of the stacked structure, 1400° C. to 2100° C. was set.

Note that, to satisfy the conditions (d) and (e), in the above first heating step for removing the moisture, this heating temperature should be made 80° C. to 100° C., preferably 90° C. to 100° C. By this, adsorbed water partially remains in the obtained metal particle-containing intermediate and the ejection of metal particles by the explosion in the later second heat treatment step becomes uneven. It is possible to prevent as much as possible the distribution of pore size of the supporting carbon material obtained as a result from becoming broader exceeding the range of 2 nm to less than 10 nm and to obtain a supporting carbon material having as uniform a pore size as possible. If the heating temperature in this first heat treatment step is less than 80° C., it becomes difficult to obtain a supporting carbon material having a uniform pore size, while conversely if over 100° C., while there is no problem in the point of obtaining a supporting carbon material having a uniform pore size, there is no difference in the supporting carbon material obtained at 100° C. or more. From an economic perspective, there is the problem that the extra added heat becomes wasted.

Further, to satisfy the conditions (f), (g), and (h), in the acetylide producing step of blowing acetylene gas into the above solution containing a metal or metal salt to cause the production of a metal acetylide, it is possible to replace the acetylene gas blowing step with a step of adding a saturated acetylene solution to produce a metal acetylide. Furthermore, by having the saturated acetylene solution be an aqueous solution having acetylene dissolved in a saturated state (saturated acetylene aqueous solution) or a ketone-based solution having acetylene dissolved in a saturated state (saturated acetylene-ketone-based solution), greater effects can be achieved. With this method, it is possible to use the saturated acetylene aqueous solution or saturated acetylene-ketone-based solution to set the acetylene concentration at the time of the reaction high, so the reaction of silver acetylide is promoted and carbon material of properties different from PLT 2 can be formed. The details of the actual formation of the carbon material in this reaction step are unknown, but the inventors etc. believe that the reaction for formation of silver acetylide is so fast that the acetylene blown in is instantaneously consumed, so by increasing the concentration of acetylene in the solution, many nuclei of silver acetylide molecule-like crystals are formed in the reaction system. The amount of the nuclei present increases whereby the nuclei contact and merge frequently and repeatedly resulting, the inventors believe, in promotion of growth of the silver acetylide. As a result, the obtained silver acetylide becomes larger in thickness and length of branches, the extent of branching also becomes greater, and a 3D tree-branch shaped structure grows resulting in a tree-branch shaped crystal. A carbon material having physical properties different from PLT 2 etc., specifically a carbon material having a large BET specific surface area or DBP oil absorption, may be formed.

3. Catalyst Metal Particle-Supporting Carbon Material and Method of Production of Same In the present invention, the above obtained carbon material for supporting a solid polymer fuel cell is used to produce a catalyst metal particle-supporting carbon material for forming a catalyst layer of an anode and/or cathode of a fuel cell. Here, the method of production of the catalyst metal particle-supporting carbon material is not particularly limited so long as a catalyst metal particle-supporting carbon material preferable for forming a catalyst layer of a fuel cell is obtained, but preferably the following method may be mentioned.

This method is the method of producing a catalyst metal particle-supporting carbon material by making the supporting carbon material disperse in a liquid dispersion medium, adding to the obtained dispersion a complex or salt of the metal forming the catalyst metal particles and a reducing agent, reducing the catalyst metal ions in the liquid phase to make the catalyst metal particles precipitate, and supporting the thus precipitated catalyst metal particles on the supporting carbon material. Preferably, it may comprise making the supporting carbon material disperse in advance in a liquid phase containing catalyst metal ions, adding the reducing agent in the state where there are sufficient catalyst metal ions present inside the pores, and thereby ensuring that the catalyst metal particles reduced inside the pores are reliably supported inside the pores.

Here, the catalyst metal particles forming the catalyst layers of the fuel cell are not particularly limited so long as having the function of promoting the chemical reaction required at the anode or cathode. As specific examples, platinum, palladium, ruthenium, gold, rhodium, osmium, iridium, tungsten, lead, iron, chrome, cobalt, nickel, manganese, vanadium, molybdenum, gallium, aluminum, or other metals or composites or alloys etc. comprised of two or more types of these metals may be mentioned, but in accordance with need, other catalyst metal ingredients may also be used.

The catalyst metal ingredient forming this catalyst metal particles is preferably platinum (Pt) or a metal mainly comprised of platinum (Pt). As the metal element to be added other than Pt, the elements Co, Ni, Fe, Pd, Au, Ru, Rh, Ir, etc. meant to improve the activity of catalyst metal particles may be mentioned. Further, the amount of these metal elements added is 50 at % or less in terms of percent of composition with respect to Pt. If the amount of addition of the metal element other than Pt exceeds 50 at %, the ratio of presence of the metal element other than Pt at the surface of the catalyst metal particles becomes greater, the element dissolves in operation of the fuel cell, and the power generation performance is liable to fall.

Further, as the liquid dispersion used for production of the catalyst metal particle-supporting carbon material, for example, water, alcohol, polyhydric alcohol, diphenyl ether, etc. are preferably used. Further, as the reducing agent added to the dispersion, for example, sodium borohydride, potassium borohydride, lithium borohydride, lithium aluminum chloride, an alcohol, formaldehyde, citric acid, formic acid, oxalic acid, etc. having carboxyl groups, etc. are suitably used.

Furthermore, the amount of the catalyst metal particles in the catalyst metal particle-supporting carbon material (rate of support of catalyst metal particles (mass %)) is 10 mass % to 60 mass % with respect to the total mass of the catalyst metal particles and supporting carbon material, preferably 20 mass % to 50 mass %. This is because when forming a catalyst metal particle-supporting carbon material as catalyst layers and generating power as a solid polymer fuel cell, diffusion of the hydrogen gas or oxygen gas used as fuel is essential. Diffusion of the hydrogen gas or oxygen gas in this catalyst layer becomes good under the above condition. Here, the rate of support of the catalyst metal particles is correlated with the distance between catalyst metal particles. If the amounts of the catalyst metal particles in the catalyst layer are equal, if the rate of support of the catalyst metal particles is low, the catalyst layer becomes thicker, the oxygen gas becomes harder to diffuse, and the fuel cell falls in power generation performance. Conversely, if the rate of support of the catalyst metal particles is high, the catalyst layer becomes thin and oxygen gas easily diffuses, but the problem arises that the distance between catalyst metal particles becomes shorter and they compete for oxygen molecules.

Note that, the supporting carbon material used in the method of production of the above catalyst metal particle-supporting carbon material is not particularly limited so long as satisfying the values of the physical properties prescribed in the present invention. However, a material which causes a chemical reaction other than the inherently sought reaction or a material which would elute a substance forming the carbon material by contact with condensed water would not be preferable. A chemically stable material is preferable.

Further, in the above explanation, mainly the application of a cathode electrode where the conditions sought are most stringent among applications of electrodes of solid polymer fuel cells was explained, but the invention may also be used for the application of an anode electrode where the conditions sought are easier than a cathode electrode.

EXAMPLES

Below, examples and comparative examples will be given to specifically explain the present invention, but the present invention is not limited to these examples and comparative examples.

Test 1

Examples 1 to 22 and Comparative Examples 1 to 20

1. Preparation of Supporting Carbon Material (1) Acetylide Generating Step for Generating Silver Acetylide 300 ml of a $NH_3$ concentration 1.9 wt % silver nitrate-containing ammonia aqueous solution containing silver nitrate in a concentration of 1.1 mol % was taken in a flask. The air in this flask (residual oxygen) was replaced with argon or dry nitrogen or other inert gas to remove it, then, while stirring, acetylene gas was blown into 150 ml of this silver nitrate-containing ammonia aqueous solution by a flow rate of 25 ml/min over about 4 minutes. The generated silver acetylide was made to precipitate as a solid and was separated by filtration by a membrane filter to obtain silver acetylide.

(2) First Heat Treatment Step of Preparing Intermediate Containing Silver Particles Next, the silver acetylide obtained in the above acetylide generating step was split into 50 mg amounts which were placed in Petri dishes. These were placed into vacuum heating containers. The gas generated during the heat treatment was sucked out to maintain a vacuum and the samples were heated at a 50° C. temperature for 3 hours. By this first heat treatment, a powder-shaped silver particle-containing intermediate with a moisture content decreased to 0.1 to 1.0 mass % or so was obtained.

(3) Second Heat Treatment Step of Obtaining Carbon Material Intermediate

Next, a pellet press-forming apparatus was used to form the powder state silver particle-containing intermediate obtained in the first heat treatment step by pressing at 0.5 $kg/cm^2$ into pellets of a size of a diameter of 5 mm×thickness of 0.2 mm and a weight of 0.5 g. The obtained pellets were placed on a heating plate of a reduced pressure heating apparatus then the system in the apparatus as a whole was held at a 1 Torr or less reduced pressure state. Next, the heating plate was used to heat the pellets by a speed of temperature rise shown in Table 1 to the heating temperature shown in Table 1 to cause an explosive reaction and prepare the carbon material intermediate.

Note that, in the case of Comparative Examples 15 to 20, in this second heat treatment step, pellets were not formed. The powder state silver particle-containing intermediate obtained at the first heat treatment step was heated as is at the heating temperature shown in Table 1 to cause an explosive reaction.

(4) Washing Step of Washing Carbon Material Intermediate

Next, the carbon material intermediate obtained in the second heat treatment step was washed by concentrated nitric acid to remove the silver particles and other unstable carbon compounds deposited on the surface of the carbon material intermediate to clean it.

(5) Third Heat Treatment Step of Obtaining Supporting Carbon Material

The cleaned carbon material intermediate obtained at the above second heat treatment step was heated using a Tammann furnace in an inert atmosphere using argon gas at a heating temperature shown in Table 1 for 2 hours to obtain the supporting carbon materials of Examples 1 to 22 and Comparative Examples 1 to 20.

Note that, in the obtained supporting carbon materials of Examples 1 to 22 and Comparative Examples 1 to 20, the supporting carbon materials of Examples 1 to 22 and Comparative Examples 1 to 14 are identified as "A" while the supporting carbon materials of Comparative Examples 15 to 20 are identified as "B". Further, the values of the speed of temperature rise (° C./min) and heating temperature (° C.) at the second heat treatment step and the heating temperature (° C.) at the third heat treatment step without their units are used as identifiers. For example, the case of Example 1 where the second heat treatment is performed by a speed of temperature rise of 100° C./min and a heating temperature of 400° C. and, further, the third heat treatment is performed at 1400° C. can be expressed as "A-100-400-1400".

TABLE 1

| | Second heat treatment | | | | Second heat treatment | | Third heat |
|---|---|---|---|---|---|---|---|
| Ex. | Rate of temp. rise (° C./min) | Rate of temp. rise (° C./min) | Third heat treatment: heating temp. (° C.) | Comp. ex. | Rate of temp. rise (° C./min) | Heating temp. (° C.) | treatment: heating temp. (° C.) |
| 1 | 100 | 400 | 1400 | 1 | 30 | 400 | 1800 |
| 2 | 100 | 400 | 1600 | 2 | 80 | 400 | 1800 |
| 3 | 100 | 400 | 1800 | 3 | 5 | 400 | 1800 |
| 4 | 100 | 400 | 2000 | 4 | 100 | 200 | 1800 |
| 5 | 100 | 400 | 2100 | 5 | 100 | 300 | 1800 |
| 6 | 100 | 450 | 1500 | 6 | 100 | 200 | 1000 |
| 7 | 100 | 500 | 1500 | 7 | 100 | 200 | 1300 |
| 8 | 100 | 600 | 1500 | 8 | 100 | 400 | 1000 |
| 9 | 150 | 500 | 1500 | 9 | 100 | 400 | 1300 |
| 10 | 200 | 500 | 1500 | 10 | 100 | 400 | 2200 |
| 11 | 300 | 500 | 1500 | 11 | 100 | 400 | 2400 |
| 12 | 500 | 500 | 1500 | 12 | 80 | 200 | 1800 |
| 13 | 300 | 500 | 1400 | 13 | 80 | 300 | 1800 |
| 14 | 300 | 500 | 1600 | 14 | 80 | 300 | 1200 |
| 15 | 300 | 500 | 1800 | 15 | — | 200 | — |
| 16 | 300 | 500 | 2000 | 16 | — | 200 | 1400 |
| 17 | 300 | 500 | 2100 | 17 | — | 200 | 1600 |
| 18 | 300 | 600 | 1800 | 18 | — | 200 | 1800 |
| 19 | 400 | 600 | 1900 | 19 | — | 200 | 2000 |
| 20 | 500 | 600 | 1900 | 20 | — | 200 | 2200 |
| 21 | 400 | 600 | 2000 | | | | |
| 22 | 500 | 600 | 2000 | | | | |

Comparative Examples 21 to 33

Further, as the commercially available carbon material, ketchen black (made by Lion, EC600JD, carbon material C), activated carbon (made by Kuraray Chemical, YP50F, carbon material D), and acetylene black not made porous (carbon black) (made by Denka, Denka Black, carbon material E) were used to prepare the supporting carbon materials of Comparative Examples 21 to 33. In Comparative Examples 21 to 26, the carbon material C was used as is without heat treatment (Comparative Example 21: C) or was used heat treated at 1400° C. (Comparative Example 22: C-1400), 1600° C. (Comparative Example 23: C-1600), 1800° C. (Comparative Example 24: C-1800), 2000° C. (Comparative Example 25: C-2000), or 2200° C. (Comparative Example 26: C-2200) to obtain supporting carbon materials. Further, in Comparative Examples 27 to 32, the carbon material D was pulverized to an average particle size of 1.2 μm and either used as is without heat treatment (Comparative Example 27: D) or used heat treated at 1400° C. (Comparative Example 28: D-1400), 1600° C. (Comparative Example 29: D-1600), 1800° C. (Comparative Example 30: D-1800), 2000° C. (Comparative Example 31: D-2000), and 2200° C. (Comparative Example 32: D-2200) to obtain the supporting carbon materials. Furthermore, in Comparative Example 33, the carbon material E was used as is without heat treatment to obtain the supporting carbon material (E).

2. Evaluation of Physical Properties of Supporting Carbon Material (a) Measurement of Specific Surface Area $S_A$ of Mesopores For the supporting carbon materials of Examples 1 to 22 and Comparative Examples 1 to 33 prepared or obtained by the above-mentioned methods, each supporting carbon material was taken in about 50 mg, dried at 90° C. in vacuo, then measured for nitrogen gas adsorption/desorption characteristics using an automatic specific surface area measurement device (made by Bel Japan, BELSORP mini). At this time, the adsorption isotherm of the adsorption process was analyzed by the Dollimore-Heal method to calculate the specific surface area $S_A$ of the pore size 2 to 50 nm mesopores. The specific surface areas $S_A$ of the mesopores of the supporting carbon materials A of Examples 1 to 22 are shown in Table 2, while the specific surface areas $S_A$ of the mesopores of the supporting carbon materials B to E of Comparative Examples 1 to 33 are shown in Table 3.

(b) Measurement of Raman Spectrum

For the supporting carbon materials of Examples 1 to 22 and Comparative Examples 1 to 33 prepared or obtained by the above-mentioned methods, each supporting carbon material was taken in about 3 mg and was measured using a Raman spectroscopy apparatus (made by JASCO Corporation, NRS-7100) under conditions of an excitation laser: 532 nm, laser power: 100 mW (sample irradiation power: 0.1 mW), microscope arrangement: back scattering, slit: 100 μm×100 μm, object lens: ×100, spot diameter: 1 μm, exposure time: 30 sec, observation wave number: 3200 to 750 $cm^{-1}$, and cumulative addition: 2 times. From the Raman spectrum obtained by measurement, the relative intensity ratio (IG'/IG) of the peak intensity (IG') of the range of 2650 to 2700 $cm^{-1}$ called the G'-band and the peak intensity (IG) of the range of 1550 to 1650 $cm^{-1}$ called the G-band was calculated and the peak position of the G'-band was found. The measurement was conducted three times and the average value of the three times was made the measurement data. The relative intensity ratios (IG'/IG) and G'-band peak positions (G' position) of the supporting carbon materials A of Examples 1 to 22 are shown in Table 2, while the relative intensity ratios (IG'/IG) and G'-band peak positions (G' position) of the supporting carbon materials B to E of Comparative Examples 1 to 33 are shown in Table 3.

3. Preparation of Solid Polymer Fuel Cell and Evaluation of Power Generation Performance (1) Preparation of Catalyst Metal Particle-Supporting Carbon Material The supporting carbon materials prepared or obtained at Examples 1 to 22 and Comparative Examples 1 to 33 were used to prepare platinum-supporting carbon materials in the following way.

That is, first, water and ethanol were mixed in a volume ratio of a 1:1 ratio. To the obtained mixed solution (liquid dispersion medium): 150 ml, 0.4 g of chloroplatinic acid by platinum conversion was added and made to dissolve, then polyvinyl pyrrolidone (molecular weight 10000): 0.2 g was further made to dissolve. In the obtained solution, the supporting carbon material: 0.6 g was dispersed, then the dispersion was heat treated for 2 hours in the boiling state to simultaneously cause reduction and supporting. After the end of the reaction, the filtrate was dried in vacuo at 90° C. The obtained solid content was fired in argon gas containing hydrogen: 10 vol % at 300° C. for 1 hour to obtain the platinum particle-supporting carbon materials of Examples 1 to 22 and Comparative Examples 1 to 33 in which particle size 4 to 6 nm platinum particles were supported in a ratio of a supported amount of 40 mass %. Note that, the supported amount of the platinum particles was confirmed by measurement by ICP-AES. Further, the particle size of the platinum particles was evaluated by the half width of the main peak of platinum in powder X-ray diffraction.

(2) Preparation of Catalyst Layer

For each of the platinum particle-supporting carbon materials of the above Examples 1 to 22 and Comparative Examples 1 to 33, first, the platinum particle-supporting carbon material: 10 mass parts was taken in a container in an Ar atmosphere. To this, as an electrolyte material, Nafion® made by Dupont: 8 mass parts (ratio of solid content) was added. This was lightly stirred, then ultrasonic waves were used to crush the platinum-supporting carbon material. Furthermore, while stirring, ethanol was added to adjust the solid content concentration of the platinum particle-supporting carbon material (Pt catalyst) and persulfonic acid-based ion exchange resin to 1 mass % and prepare a platinum catalyst ink comprised of a Pt catalyst and an electrolyte resin mixed together. After that, part of the obtained platinum catalyst ink was taken and ethanol was added to this platinum catalyst ink while stirring to prepare a platinum catalyst ink for coating use with a platinum concentration of 0.5 mass %.

Next, the mass of the platinum particles (catalyst metal particles) coated per unit area of the catalyst metal particles catalyst layer (below, platinum basis weight) was set to 0.2 mg/cm$^2$ and the spray conditions were adjusted to give the targeted platinum basis weight. The above coating-use platinum catalyst ink was sprayed on a Teflon® sheet under the adjusted conditions, then was treated to dry it in argon at 120° C. for 60 minutes to obtain the catalyst layers of the anode and cathode.

(3) Preparation of MEAs

The above prepared catalyst layers of Examples 1 to 22 and Comparative Examples 1 to 33 were used to prepare membrane electrode assemblies (MEA) by the following method.

From a Nafion membrane (made by Dupont, NR211), a square shaped electrolyte membrane having 6 cm sides was cut out. Further, the catalyst layers of the anode and cathode coated on Teflon® sheets were cut out by cutter knives to square shapes of 2.5 cm sides. Between the catalyst layers of the thus cut out anode and cathode, this electrolyte membrane was sandwiched so that the catalyst layers straddled and contacted the center part of the electrolyte membrane without being offset from each other. These were pressed for 10 minutes while heating and pressing by 120° C. and 100 kg/cm$^2$, then were cooled down to room temperature. After that, at both the anode and cathode, just the Teflon® sheets were carefully peeled off to prepare a catalyst layer-electrolyte membrane assembly comprised of an electrolyte membrane at the two sides of which catalyst layers of the anode and cathode were fixed.

Next, as the gas diffusion layers, from carbon paper (made by SGL Carbon, 35BC), a pair of square shapes of carbon paper of sizes of 2.5 cm sides were cut out. Between these sheets of carbon paper, the above catalyst layer-electrolyte membrane assembly was inserted so that the catalyst layers of the anode and cathode matched without offset. The assembly was pressed by heating and pressing at 120° C. and 50 kg/cm$^2$ for 10 minutes to prepare the MEA of each of Examples 1 to 22 and Comparative Examples 1 to 33.

Note that, the composition of the catalyst metal and the basis weights of the components of the carbon material and electrolyte material at the thus prepared MEAs were found by finding the mass of the catalyst layers fixed to the Nafion membrane electrolyte membrane from the difference between the mass of the Teflon® sheets with the catalyst layers before pressing and the mass of the Teflon® sheets after pressing and peeling (electrolyte membrane) and calculating using the mass ratio of the composition of the catalyst layer.

Further, for the anode, the carbon material A-100-400-1400 (Example 1) was used in common so as to extract only the performance of the cathode catalyst layer from the results of evaluation of the power generation characteristics.

(4) Evaluation of Power Generation Performance

The MEAs prepared in Examples 1 to 22 and Comparative Examples 1 to 33 were assembled into fuel cells. The cells were set in a fuel cell measurement device, then the following procedure was used to evaluate the power generation performance of the fuel cells by the following procedure.

For the gas, air was supplied to the cathode and, further, pure hydrogen was supplied to the anode under atmospheric pressure so that the rates of utilization became 40% and 70%. Further, the cell temperature was set to 80° C. The supplied gases for both the cathode and anode were bubbled through distilled water warmed to 65° C. in a humidifier to introduce water vapor corresponding to modified hydrogen for supply to the cell.

Under conditions of supplying gases to the cell under such settings, the load was gradually increased and the voltage across cell terminals at 1200 mA/cm$^2$ was recorded as the output voltage for evaluation as the initial power generation performance of the fuel cell (characteristic before deterioration).

Further, for evaluating the durability of the fuel cells, a durability test was run using a load adjuster to hold a cell from the outside by first 0.6V for 6 seconds, then hold it at 1.3V for 6 seconds, then again hold it at 0.6V for 6 seconds and repeating this load fluctuation 500 times. After that, the same procedure was performed as the evaluation of the initial power generation performance (characteristic before deterioration) to record the voltage across cell terminals at 1200 mA/cm$^2$ as the output voltage and evaluate the power generation performance after a durability test of the fuel cell (characteristics after deterioration).

The power generation performances of the obtained fuel cells were evaluated overall by the following criteria (overall evaluation):

"⊚" (very good) level: Sample satisfying both output voltage before durability test at 1200 mA/cm$^2$ of 0.60V or more and output voltage after durability test of of 0.50V or more.

"○" (good) level: Sample satisfying both output voltage before durability test at 1200 mA/cm$^2$ of 0.60V or more and output voltage after durability test of 0.45V to less than 0.50V.

"x" (poor) level: Sample not satisfying "○" (good) level.

The above results are shown in Table 2 and Table 3.

TABLE 2

| | Supporting carbon material | | | | Power generation performance | | |
|---|---|---|---|---|---|---|---|
| | Heat treatment type | Mesopore specific surface area (m$^2$/g) | IG'/IG | G' position (com$^{-1}$) | Initial | Durability test | Overall eval. |
| Ex. 1 | A-100-400-1400 | 1580 | 0.82 | 2664 | 0.62 | 0.45 | ○ |
| Ex. 2 | A-100-400-1600 | 1350 | 0.96 | 2663 | 0.62 | 0.46 | ○ |
| Ex. 3 | A-100-400-1800 | 1120 | 1.16 | 2661 | 0.61 | 0.54 | ○ |
| Ex. 4 | A-100-400-2000 | 890 | 1.86 | 2669 | 0.62 | 0.56 | ○ |

TABLE 2-continued

| | | Supporting carbon material | | | Power generation performance | | |
|---|---|---|---|---|---|---|---|
| | | | Mesopore | | | | |
| | Heat treatment type | specific surface area (m²/g) | IG'/IG | G' position (com⁻¹) | Initial | Durability test | Overall eval. |
| Ex. 5 | A-100-400-2100 | 740 | 1.93 | 2669 | 0.62 | 0.55 | ◯ |
| Ex. 6 | A-100-450-1500 | 1410 | 0.89 | 2664 | 0.61 | 0.45 | ◯ |
| Ex. 7 | A-100-500-1500 | 1270 | 2.08 | 2664 | 0.66 | 0.46 | ◯ |
| Ex. 8 | A-100-600-1500 | 1320 | 2.16 | 2665 | 0.67 | 0.46 | ◯ |
| Ex. 9 | A-150-500-1500 | 1350 | 2.11 | 2664 | 0.67 | 0.47 | ◯ |
| Ex. 10 | A-200-500-1500 | 1390 | 2.03 | 2663 | 0.66 | 0.47 | ◯ |
| Ex. 11 | A-300-500-1500 | 1360 | 1.96 | 2661 | 0.67 | 0.46 | ◯ |
| Ex. 12 | A-500-500-1500 | 1290 | 1.55 | 2661 | 0.67 | 0.46 | ◯ |
| Ex. 13 | A-300-500-1400 | 1260 | 1.32 | 2661 | 0.66 | 0.46 | ◯ |
| Ex. 14 | A-300-500-1600 | 1210 | 1.23 | 2661 | 0.68 | 0.48 | ◯ |
| Ex. 15 | A-300-500-1800 | 1160 | 1.63 | 2663 | 0.67 | 0.56 | ◎ |
| Ex. 16 | A-300-500-2000 | 890 | 1.86 | 2668 | 0.67 | 0.57 | ◎ |
| Ex. 17 | A-300-500-2100 | 730 | 1.93 | 2668 | 0.66 | 0.57 | ◎ |
| Ex. 18 | A-300-600-1800 | 1090 | 1.66 | 2664 | 0.68 | 0.55 | ◎ |
| Ex. 19 | A-400-600-1900 | 950 | 1.73 | 2666 | 0.69 | 0.57 | ◎ |
| Ex. 20 | A-500-600-1900 | 960 | 1.77 | 2666 | 0.67 | 0.56 | ◎ |
| Ex. 21 | A-400-600-2000 | 810 | 1.84 | 2667 | 0.65 | 0.58 | ◎ |
| Ex. 22 | A-500-600-2000 | 820 | 1.89 | 2666 | 0.65 | 0.57 | ◎ |

TABLE 3

| | | Supporting carbon material | | | Power generation performance | | |
|---|---|---|---|---|---|---|---|
| | | | Mesopore | | | | |
| | Heat treatment type | specific surface area (m²/g) | IG'/IG | G' position (com⁻¹) | Initial | Durability test | Overall eval. |
| Comp. Ex. 1 | A-30-400-1800 | 1280 | 2.35 | 2658 | 0.56 | 0.42 | × |
| Comp. Ex. 2 | A-80-400-1800 | 1210 | 2.27 | 2658 | 0.56 | 0.41 | × |
| Comp. Ex. 3 | A-5-400-1800 | 1310 | 2.61 | 2655 | 0.56 | 0.42 | × |
| Comp. Ex. 4 | A-100-200-1800 | 1260 | 2.52 | 2659 | 0.54 | 0.41 | × |
| Comp. Ex. 5 | A-100-300-1800 | 1230 | 2.44 | 2657 | 0.56 | 0.41 | × |
| Comp. Ex. 6 | A-100-200-1000 | 1710 | 0.55 | 2654 | 0.56 | 0.4 | × |
| Comp. Ex. 7 | A-100-200-1300 | 1460 | 0.61 | 2655 | 0.55 | 0.4 | × |
| Comp. Ex. 8 | A-100-400-1000 | 1690 | 0.59 | 2654 | 0.56 | 0.39 | × |
| Comp. Ex. 9 | A-100-400-1300 | 1580 | 0.66 | 2656 | 0.55 | 0.39 | × |
| Comp. Ex. 10 | A-100-400-2200 | 580 | 2.69 | 2673 | 0.53 | 0.42 | × |
| Comp. Ex. 11 | A-100-400-2400 | 420 | 2.26 | 2675 | 0.53 | 0.41 | × |
| Comp. Ex. 12 | A-80-200-1800 | 1210 | 2.31 | 2671 | 0.52 | 0.41 | × |
| Comp. Ex. 13 | A-80-300-1800 | 1190 | 2.41 | 2672 | 0.53 | 0.4 | × |
| Comp. Ex. 14 | A-80-300-1200 | 1630 | 0.71 | 2558 | 0.53 | 0.41 | × |
| Comp. Ex. 15 | B | 1260 | 2.16 | 2673 | 0.51 | 0.32 | × |
| Comp. Ex. 16 | B-1400 | 1100 | 2.23 | 2675 | 0.52 | 0.38 | × |
| Comp. Ex. 17 | B-1600 | 750 | 2.44 | 2677 | 0.49 | 0.4 | × |
| Comp. Ex. 18 | B-1800 | 520 | 2.86 | 2677 | 0.46 | 0.42 | × |

TABLE 3-continued

| | | Supporting carbon material | | | Power generation performance | | |
|---|---|---|---|---|---|---|---|
| | | | Mesopore | | | | |
| | Heat treatment type | specific surface area (m²/g) | IG'/IG | G' position (com⁻¹) | Initial | Durability test | Overall eval. |
| Comp. Ex. 19 | B-2000 | 430 | 3.11 | 2677 | 0.44 | 0.39 | × |
| Comp. Ex. 20 | B-2200 | 410 | 3.62 | 2678 | 0.41 | 0.32 | × |
| Comp. Ex. 21 | C | 960 | 0.31 | 2651 | 0.41 | 0.32 | × |
| Comp. Ex. 22 | C-1400 | 920 | 0.42 | 2657 | 0.39 | 0.32 | × |
| Comp. Ex. 23 | C-1600 | 750 | 0.55 | 2663 | 0.39 | 0.33 | × |
| Comp. Ex. 24 | C-1800 | 640 | 0.61 | 2668 | 0.39 | 0.33 | × |
| Comp. Ex. 25 | C-2000 | 420 | 0.86 | 2672 | 0.38 | 0.35 | × |
| Comp. Ex. 26 | C-2200 | 360 | 1.02 | 2674 | 0.38 | 0.36 | × |
| Comp. Ex. 27 | D | 1820 | 0.31 | 2651 | 0.41 | 0.32 | × |
| Comp. Ex. 28 | D-1400 | 1450 | 0.42 | 2657 | 0.39 | 0.32 | × |
| Comp. Ex. 29 | D-1600 | 1060 | 0.55 | 2663 | 0.39 | 0.33 | × |
| Comp. Ex. 30 | D-1800 | 680 | 0.61 | 2668 | 0.39 | 0.33 | × |
| Comp. Ex. 31 | D-2000 | 420 | 0.86 | 2672 | 0.38 | 0.35 | × |
| Comp. Ex. 32 | D-2200 | 360 | 1.02 | 2674 | 0.38 | 0.36 | × |
| Comp. Ex. 33 | E | 82 | 1.36 | 2671 | 0.46 | 0.4 | × |

The MEAs using the supporting carbon materials of Examples 1 to 22 of the present invention shown in Table 2 all exhibited excellent power generation performances of the "◯" (good) level or more. In particular, the MEAs using the supporting carbon materials of Examples 15 to 22 had values of the mesopore specific surface area, IG'/IG, and G' peak position satisfying the preferable ranges and exhibited better power generation performances. As opposed to this, none of the MEAs using the supporting carbon materials of the comparative examples shown in Table 3 exhibited the "◯" (good) level.

In each of Comparative Examples 1 to 3, the speed of temperature rise in the second treatment step at the time of production was low, the growth of graphene was not sufficient, the IG'/IG and the peak position of the G' band were outside the ranges of the present invention, and, in particular, the initial characteristics were low.

In each of Comparative Examples 4 and 5, the heating temperature at the second heat treatment step was low, in the same way as the case of Comparative Examples 1 to 3, the growth of the graphene structure was insufficient, further, even if the heating temperature at the third heat treatment step was sufficiently high, the skeleton structure was believed to be changed. The durability was improved, but the initial characteristics remarkably fell. In the supporting carbon materials of Comparative Examples 4 and 5, the value of IG'/IG in the Raman spectrum and the peak position of the G' band were outside the ranges of the present invention.

In each of Comparative Examples 6 and 7, the heating temperature at the second heat treatment step was low and, further, the heating temperature at the third heat treatment step was low, so the initial characteristics were relatively good, but there was little graphene growth, the crystallinity was low, and the durability was poor.

In each of Comparative Examples 8 to 11, at the second heat treatment step, the heating temperature was sufficient and a sufficient explosive energy was given, but the heating temperature at the third heat treatment step was low or too high. If the heating temperature is low (Comparative Examples 8 and 9), the initial characteristics become relatively good, but the durability is poor. Conversely, when the heating temperature is high (Comparative Examples 10 and 11), along with the growth of the crystal structure, the pore structure ends up being crushed. Due to this change in the pore structure, the initial characteristics greatly fall. The supporting carbon materials of Comparative Examples 8 and 9 had a small IG'/IG, further had a small wave number even at the position of the G'-band, and had a low developed graphene structure. Further, the supporting carbon materials of Comparative Examples 10 and 11 had a large IG'/IG, further had a large wave number of the peak position of the G'-band, had a highly developed crystallinity, and had too many graphene layers.

In Comparative Examples 12 to 14, both the speed of temperature rise and the heating temperature at the second heat treatment step were low, the explosive energy was small, and the growth of the graphene structure was weak. In Comparative Examples 12 and 13, the heating temperature in the third heat treatment step was suitable, but the initial characteristics and durability could not be balanced. If the explosive energy is not suitable in state, even if changing the heat treatment in the third heat treatment step, the graphene skeleton determined at the second heat treatment step is weak and easily changes by heat treatment, so the initial characteristics and durability cannot both be obtained. The supporting carbon materials of Comparative Examples 12 and 13 had a large IG'/IG (too highly developed a graphene structure) and, further, a large wave number of the peak position of the G'-band (too large a number of graphene layers). Further, in Comparative Example 14, heat treatment at the second heat treatment step the same as Comparative Example 13 was performed while the heating temperature at the third heat treatment step was set low. However, the supporting carbon material of Comparative Example 14 had a small IG'/IG (weak graphene structure), further had a small wave number of the peak position of the G'-band (too small a number of stacked layers of graphene), and did not have a good balance of the initial characteristics and the durability.

Comparative Examples 15 to 20 show the results of the carbon material B prepared by substantially the same method of production as PLT 2. If the explosive energy at the second heat treatment step is weak, the growth of the graphene structure is weak, and the heating temperature at the third heat treatment step is raised, the skeleton structure ends up changing and the initial characteristics (skeleton structure) and durability (growth of graphene structure) cannot both be obtained or balanced. In the third heat treatment step, if raising the heating temperature to 1800° C. or more, the pore structure is crushed, the basic function of the support (supporting performance) falls, and the power generation performance falls. Further, with 1600° C. or less heating temperature, the power generation performance is relatively good, but the durability is poor. The supporting carbon materials of Comparative Examples 15 to 20 had large wave numbers of the peak positions of the G'-band and had basically too many stacked graphene layers, so the performance could not be balanced.

Comparative Examples 21 to 26 are cases using supporting carbon materials comprised of the conventional carbon material C. When performing heat treatment by the third heat treatment step, the specific surface area remarkably fell and the initial power generation performance and durability could not both be obtained. Further, Comparative Examples 27 to 32 are cases of using supporting carbon materials comprised of the conventional carbon material D. They failed to reach the "◯" (good) level even with heat treatment by the third heat treatment step. Furthermore, Comparative Example 33 is the case of using a supporting carbon material comprising a conventional carbon material E, having a mesopore specific surface area of a small 82 $m^2/g$, further having a large wave number of the peak position of the G'-band, and not reaching the "◯" (good) level.

Test 2

Examples 101 to 116 and Comparative Examples 101 to 104

1. Preparation of Supporting Carbon Material

In Test 1, the temperature 50° C. of the vacuum drying in the (2) first heat treatment step for preparing the silver particle-containing intermediate was changed to 40 to 100° C. as shown in Table 4. The treatment time was studied in the range of 0.5 hour to 10 hours. Further, the temperature of the second heat treatment, as shown in Table 4, was studied in the range of 300° C. to 600° C. The rest of the steps were made the same as Example 15 of Test 1. That is, the speed of temperature rise in the second heat treatment was made 300° C./min while the third heating temperature was made 1800° C.

TABLE 4

|  | First heating temperature | | Second heating temperature |
|---|---|---|---|
|  | Temp. (° C.) | Time (hr) | Temp. (° C.) |
| Ex. 101 | 80 | 3.0 | 400 |
| Ex. 102 | 80 | 5.0 | 400 |
| Ex. 103 | 80 | 7.0 | 400 |
| Ex. 104 | 80 | 10.0 | 400 |
| Ex. 105 | 85 | 3.0 | 400 |
| Ex. 106 | 85 | 5.0 | 400 |
| Ex. 107 | 85 | 7.0 | 400 |
| Ex. 108 | 85 | 10.0 | 400 |
| Ex. 109 | 90 | 5.0 | 400 |
| Ex. 110 | 100 | 3.0 | 400 |
| Ex. 111 | 100 | 5.0 | 400 |
| Ex. 112 | 100 | 7.0 | 400 |
| Ex. 113 | 100 | 10.0 | 400 |
| Ex. 114 | 100 | 10.0 | 500 |
| Ex. 115 | 100 | 10.0 | 600 |
| Ex. 116 | 75 | 1.0 | 400 |
| Comp. Ex. 101 | 45 | 0.5 | 350 |
| Comp. Ex. 102 | 40 | 1.5 | 350 |
| Comp. Ex. 103 | 50 | 1.0 | 300 |
| Comp. Ex. 104 | 45 | 1.5 | 300 |

2. Evaluation of Physical Properties of Supporting Carbon Material

In addition to the evaluation of physical properties of the Test 1, the same procedure was followed as with measurement of the specific surface area of the mesopores of Test 1 so as to measure the supporting carbon materials of Examples 101 to 116 and Comparative Examples 101 to 104 for nitrogen gas adsorption/desorption characteristics. The obtained nitrogen adsorption isotherms of the adsorption process were analyzed by the Dollimore-Heal method to find the values of the specific pore area $S_{2-10}$ and specific pore volume $V_{2-10}$ of pores of a pore size of 2.0 to 10.0 nm and the specific pore area $S_{10-50}$ of pores of a pore size of 10.0 to 50.0 nm. The value of the specific pore area $S_2$ of the pores with a pore size of less than 2.0 nm was found by analysis of a nitrogen adsorption isotherm of the adsorption process by the Horvath-Kawazoe method (HK method). The results of these specific pore area $S_{2-10}$, specific pore volume $V_{2-10}$, specific pore area $S_{10-50}$, and specific pore area $S_2$ are shown in Table 5. Note that, the analyses by the Dollimore-Heal method and HK method were performed using analysis software attached to an apparatus for measuring the nitrogen gas adsorption/desorption characteristics (Bel Mini made by Bel Japan).

3. Preparation of Solid Polymer Fuel Cell and Evaluation of Power Generation Performance Next, the thus prepared supporting carbon materials of Examples 101 to 116 and Comparative Examples 101 to 104 were used to perform the same procedure as in Test 1 to prepare catalysts for solid polymer fuel cells, catalyst layers, and MEAs.

(1) Evaluation of Power Generation Performance

The prepared MEAs were assembled into cells. The cells were set in a fuel cell measurement device. As the evaluation of performance of the fuel cells, in addition to the evaluation of performance of Test 1, the current density at a cell voltage of 0.3V was measured.

The results of evaluation of the performances of the obtained fuel cells were evaluated overall by the following criteria (overall evaluation).

"⊚⊚" (excellent) level: Sample satisfying conditions of output voltage at 1200 mA/cm² of 0.65V or more, output voltage after durability test of 0.55V or more, and current density at 0.3V cell voltage of 1700 mA/cm² or more "⊚" (very good) level: Sample satisfying output voltage at 1200 mA/cm² of 0.60V or more, output voltage after durability test of 0.50V or more, and and current density at 0.3V cell voltage of 1600 mA/cm² or more "○" (good) level: Sample satisfying output voltage at 1200 mA/cm² of 0.60V or more, output voltage after durability test of 0.45V or more, and current density at 0.3V cell voltage of 1600 mA/cm²

"x" (poor)" level: Sample not satisfying "○" (good) level
The results are shown in Table 5.

TABLE 5

| | Supporting carbon material | | | | | | | Power generation performance | | | |
|---|---|---|---|---|---|---|---|---|---|---|---|
| | Mesopore specific surface area SA (m²/g) | IG'/IG | G' position (cm⁻¹) | Specific pore area $S_{2-10}$ (m²/g) | Specific pore volume $V_{2-10}$ | Specific pore area $S_{10-50}$ (m²/g) | Specific pore area $S_2$ (m²/g) | Output voltage at 1200 mA/cm² | | Current density at 0.3 V cell voltage (mA/cm²) | Overall eval. |
| | | | | | | | | Initial (V) | After durability test (V) | | |
| Ex. 101 | 1240 | 1.2 | 2665 | 1090 | 1.3 | 146 | 530 | 0.61 | 0.46 | 1610 | ○ |
| Ex. 102 | 605 | 1.3 | 2666 | 455 | 0.52 | 145 | 310 | 0.62 | 0.46 | 1620 | ○ |
| Ex. 103 | 1010 | 1.3 | 2667 | 890 | 1.56 | 120 | 420 | 0.62 | 0.47 | 1630 | ○ |
| Ex. 104 | 740 | 1.4 | 2665 | 620 | 0.43 | 115 | 380 | 0.63 | 0.48 | 1610 | ○ |
| Ex. 105 | 1180 | 1.4 | 2667 | 1030 | 1.3 | 149 | 510 | 0.62 | 0.46 | 1620 | ○ |
| Ex. 106 | 1000 | 1.1 | 2665 | 980 | 1.4 | 22 | 290 | 0.61 | 0.46 | 1620 | ○ |
| Ex. 107 | 960 | 1.2 | 2663 | 850 | 1.2 | 105 | 545 | 0.62 | 0.47 | 1630 | ○ |
| Ex. 108 | 890 | 1.2 | 2664 | 760 | 1.0 | 125 | 255 | 0.63 | 0.47 | 1630 | ○ |
| Ex. 109 | 960 | 1.3 | 2665 | 870 | 1.3 | 85 | 420 | 0.62 | 0.46 | 1700 | ○ |
| Ex. 110 | 1070 | 1.6 | 2663 | 980 | 1.2 | 85 | 320 | 0.63 | 0.51 | 1710 | ⊚ |
| Ex. 111 | 970 | 1.6 | 2667 | 880 | 1.3 | 90 | 460 | 0.63 | 0.52 | 1710 | ⊚ |
| Ex. 112 | 1050 | 1.5 | 2666 | 950 | 1.2 | 95 | 330 | 0.63 | 0.52 | 1710 | ⊚ |
| Ex. 113 | 995 | 1.3 | 2665 | 920 | 1.1 | 75 | 360 | 0.63 | 0.52 | 1710 | ⊚ |
| Ex. 114 | 1040 | 1.2 | 2664 | 960 | 1.2 | 80 | 350 | 0.66 | 0.55 | 1720 | ⊚⊚ |
| Ex. 115 | 1065 | 1.3 | 2665 | 980 | 1.3 | 85 | 400 | 0.67 | 0.56 | 1760 | ⊚⊚ |
| Ex. 116 | 1310 | 1.0 | 2662 | 1150 | 1.5 | 160 | 450 | 0.62 | 0.46 | 1500 | x |
| Comp. Ex. 101 | 1610 | 1.0 | 2663 | 1460 | 1.6 | 145 | 530 | <0.30 | <0.30 | 1450 | x |
| Comp. Ex. 102 | 425 | 1.1 | 2661 | 410 | 0.31 | 15 | 255 | <0.30 | <0.30 | 1460 | x |
| Comp. Ex. 103 | 1060 | 0.6 | 2661 | 850 | 1.55 | 210 | 420 | <0.30 | <0.30 | 1430 | x |
| Comp. Ex. 104 | 1045 | 0.9 | 2598 | 900 | 1.4 | 145 | 620 | <0.30 | <0.30 | 1440 | x |

In the results of evaluation of the fuel cell performance shown in Table 5, Examples 101 to 115 had characteristics evaluated by Test 1 (specific surface area $S_A$, IG'/IG, and G' peak position) in the ranges of the present invention and a specific pore area $S_{2-10}$, specific pore volume $V_{2-10}$, specific pore area $S_{10-50}$, and specific pore area $S_2$ in the ranges of the present invention. As a result, these samples satisfied the "○" (good) level. In particular, Examples 110 to 115 had a specific pore area $S_{2-10}$, specific pore volume $V_{2-10}$, specific pore area $S_{10-50}$, and specific pore area $S_2$ in the preferable ranges, so satisfied the "⊚" (very good) level or the "⊚⊚" (excellent) level.

Note that, Example 116 had the characteristics evaluated by Test 1 in the ranges of the present invention, so is a working example and satisfied the "○" (good) level of Test 1. However, Examples 116 had a specific pore area $S_{2-10}$ and specific pore area $S_{10-50}$ outside the ranges, so had a low current density and could not satisfy the "○" (good) level of Test 2.

Further, Comparative Examples 101 to 104 where at least one of the characteristics evaluated in Test 1 was outside the range of the present invention and at least one of the specific pore area $S_{2-10}$, specific pore volume $V_{2-10}$, specific pore area $S_{10-50}$, and specific pore area $S_2$ was outside the range of the present invention failed to satisfy the "○" (good) level of Test 1 and the "○" (good) level of Test 2.

Test 3

Examples 201 to 216 and Comparative Examples 201 to 204

1. Preparation of Supporting Carbon Material

In the Test 2, only (1) the step of preparation of the silver acetylide was changed to the following step. The other steps were the same as Example 105 of Test 2. That is, first, an ammonia aqueous solution containing silver nitrate in the concentration shown in Table 6 (concentration: 1.3 to 2.7 mass %) was taken in a flask. The air inside this flask was replaced with argon or dry nitrogen or other inert gas to remove the oxygen, then, while stirring, a tabletop ultrasonic generator (70 W) was used to fire ultrasonic waves while the amount of saturated acetylene aqueous solution or saturated acetylene-acetone solution shown in Table 1 was added to 500 ml of the above ammonia aqueous solution of silver nitrate to cause solids of silver acetylide to precipitate in the ammonia aqueous solution. Next, the precipitate was separated by filtration by the membrane filter, the obtained precipitate was washed with methanol, and further some ethanol was added after washing to impregnate this precipitate with methanol. By doing this, it is possible to prepare silver acetylide serving as a carbon material with a large DBP oil adsorption grown in a tree-branch shaped structure.

TABLE 6

| | Silver nitrate concentration (mass %) | Amount of aqueous solution (ml) | Amount of acetone solution (ml) |
|---|---|---|---|
| Ex. 201 | 1.3 | 250 | None |
| Ex. 202 | 1.3 | 500 | None |
| Ex. 203 | 1.3 | 1000 | None |
| Ex. 204 | 1.5 | 500 | None |
| Ex. 205 | 1.5 | 1000 | None |
| Ex. 206 | 1.7 | 500 | None |
| Ex. 207 | 1.7 | 1000 | None |
| Ex. 208 | 1.9 | 500 | None |
| Ex. 209 | 1.9 | 1000 | None |
| Ex. 210 | 2.1 | 500 | None |
| Ex. 211 | 2.1 | 1000 | None |
| Ex. 212 | 1.3 | None | 90 |
| Ex. 213 | 1.5 | None | 90 |
| Ex. 214 | 1.7 | None | 90 |
| Ex. 215 | 1.9 | None | 90 |
| Ex. 216 | 2.1 | None | 90 |
| Comp. Ex. 201 | 2.1 | 1000 | 130 |
| Comp. Ex. 202 | 2.5 | 250 | None |
| Comp. Ex. 203 | 2.7 | 250 | None |
| Comp. Ex. 204 | 2.7 | None | 50 |
| Comp. Ex. 205 | 2.7 | None | 70 |

2. Evaluation of Physical Properties of Supporting Carbon Material

In addition to the evaluations of properties of Tests 1 and 2, the following were evaluated:
(a) BET Specific Surface Area The BET specific surface area $S_{BET}$ was measured for the supporting carbon materials of Examples 201 to 216 and Comparative Examples 201 to 204 using an Autosorb I-MP made by Quantachrome Instruments by the gas adsorption method using nitrogen gas and determining the specific surface area by the one-point method based on the BET method.

(b) DBP Oil Absorption

The DBP oil absorption was determined for the supporting carbon materials of Examples 201 to 216 and Comparative Examples 201 to 204 using an Absorptometer (made by Brabender) and converting the amount of addition of DBP at the time of 70% of the maximum torque to the DBP oil absorption per 100 g of sample.

(c) Raman Spectrum

The Raman spectrum was measured for the supporting carbon materials of Examples 201 to 216 and Comparative Examples 201 to 204 by measuring out about 3 mg of the supporting carbon materials and using a laser Raman spectrophotometer (made by JASCO Corporation, NRS-3100) under conditions of an excitation laser: 532 nm, laser power: 10 mW (sample irradiation power: 1.1 mW), microscope arrangement: back scattering, object lens: ×100, spot diameter: 1 μm, exposure time: 30 sec, observation wave number: 2000 to 300 cm$^{-1}$, and cumulative addition: 6 times. From the Raman spectrum obtained by measurement, the half width (ΔG) of the G-band (range of 1550 to 1650 cm$^{-1}$) was calculated.

2. Preparation of Solid Polymer Fuel Cell and Evaluation of Power Generation Performance Next, using the above prepared supporting carbon materials of Examples 201 to 216 and Comparative Examples 201 to 204, the same procedure was performed as Test 1 to prepare catalysts, catalyst layers, and MEAs for solid polymer fuel cells.

(1) Evaluation of Power Generation Performance

The prepared MEAs were assembled into cells and set in a fuel cell measurement device to evaluate the performance of the fuel cells. In addition to the evaluation of performance of Tests 1 and 2, a durability test different from the durability test of Test 1 was performed.

(2) Durability Test of Fuel Cells

As the durability test, the voltage across the cell terminals was held at 1.0V for 1 second, then the voltage across the cell terminals was made to rise to 1.5V and held there for 1 second, then the initial cell terminal voltage was returned to 1.0V. This cycle was repeated 4000 times. After that, the battery performance was measured in the same way as the case of the test for evaluation of the initial performance before the durability test. For the gas, air was fed to the cathode and pure hydrogen was fed to the anode to give respective rates of utilization of 40% and 70%. The respective gas pressures were adjusted to atmospheric pressure at back pressure valves provided downstream of the cell. The cell temperature was set to 80° C., but the fed air and pure hydrogen were respectively bubbled in distilled water warmed to 60° C. to moisten them. As the durability test, compared with the durability test of Test 1, the amount of fluctuation of voltage became larger. How much the output voltage at 1200 mA/cm$^2$ after the durability test dropped compared with the output voltage before the durability test was found as the rate of drop.

The obtained results of the evaluation of performance of the fuel cell were evaluated overall (overall evaluation) by the following standards:

"◎◎" (excellent) level: Sample satisfying output voltage at 1200 mA/cm² of 0.65V or more, output voltage after durability test of 0.55V or more, current density at 0.3V cell voltage of 1700 mA/cm² or more, and rate of drop of less than 10%

"◎" (very good) level: Sample satisfying output voltage at 1200 mA/cm² of 0.60V or more, output voltage after durability test of 0.50V or more, current density at 0.3V cell voltage of 1600 mA/cm² or more, and rate of drop of less than 15%

"○" (good) level: Sample satisfying output voltage at 1200 mA/cm² of 0.60V or more, output voltage after durability test of 0.45V or more, current density at 0.3V cell voltage of 1600 mA/cm² or more, and rate of drop of less than 20%

"x" (poor) level: Sample not satisfying the "○" (good) level

The results are shown in Table 7.

BET specific surface area $S_{BET}$, DBP oil absorption (X), $X/S_{BET}$, and G-band half width ($\Delta G$) were in the ranges of the present invention. For this reason, the current density was improved, the rate of drop also fell, and the "○" (good) level of Test 3 was satisfied.

Further, Example 216 had characteristics evaluated in Test 1 and Test 2 in the ranges of the present invention, so is a working example. Therefore, the "○" (good) levels of Test 1 and Test 2 were satisfied. However, Example 216 had an $X/S_{BET}$ outside the range, so the rate of drop was large and the "○" (good) level of Test 3 could not be satisfied.

Further, Comparative Examples 101 to 104 where, among the characteristics evaluated at Test 1 and Test 2, at least one was outside the range of the present invention and at least one of the BET specific surface area $S_{BET}$, DBP oil absorp-

TABLE 7

| | Supporting carbon material | | | | | | | | | | | Power generation performance | | | |
|---|---|---|---|---|---|---|---|---|---|---|---|---|---|---|---|
| | Mesopore specific surface area SA (m²/g) | IG'/IG | G' position (cm⁻¹) | Specific pore area $S_{2\text{-}10}$ (m²/g) | Specific pore volume $V_{2\text{-}10}$ (m²/g) | Specific pore area $S_{10\text{-}50}$ (m²/g) | Specific pore area $S_2$ (m²/g) | DBP oil absorption (X) (cm³/100 g) | BET specific surface area $S_{BET}$ (m²/g) | $X/S_{BET}$ (nm) | G-band half width (cm⁻¹) | Output voltage at 1200 mA/cm² Initial (V) | Output voltage at 1200 mA/cm² After durability test (V) | Current density at 0.3 V cell voltage (mA/cm²) | Output voltage drop (%) | Overall eval. |
| Ex. 201 | 1155 | 0.9 | 2669 | 1010 | 1.45 | 145 | 265 | 640 | 1410 | 4.5 | 71 | 0.62 | 0.46 | 1620 | 19 | ○ |
| Ex. 202 | 1205 | 2.1 | 2668 | 1080 | 1.5 | 125 | 285 | 450 | 1465 | 3.1 | 72 | 0.61 | 0.46 | 1615 | 18 | ○ |
| Ex. 203 | 1196 | 2.15 | 2669 | 1080 | 1.45 | 115 | 290 | 670 | 1470 | 3.9 | 39 | 0.62 | 0.45 | 1610 | 19 | ○ |
| Ex. 204 | 605 | 0.85 | 2661 | 465 | 1.55 | 135 | 255 | 300 | 620 | 4.8 | 43 | 0.63 | 0.47 | 1620 | 18 | ○ |
| Ex. 205 | 1080 | 0.85 | 2661 | 1060 | 1.5 | 20 | 300 | 560 | 1380 | 4.1 | 47 | 0.63 | 0.46 | 1625 | 19 | ○ |
| Ex. 206 | 1055 | 2.05 | 2662 | 1030 | 1.5 | 25 | 270 | 620 | 1420 | 4.4 | 37 | 0.61 | 0.47 | 1610 | 19 | ○ |
| Ex. 207 | 1130 | 2.1 | 2689 | 1020 | 1.45 | 110 | 290 | 490 | 1410 | 3.5 | 73 | 0.62 | 0.47 | 1615 | 18 | ○ |
| Ex. 208 | 1125 | 2.15 | 2689 | 1010 | 1.5 | 115 | 255 | 435 | 1380 | 3.2 | 32 | 0.63 | 0.46 | 1620 | 18 | ○ |
| Ex. 209 | 925 | 2.0 | 2662 | 890 | 1.55 | 35 | 400 | 500 | 1320 | 3.8 | 72 | 0.62 | 0.45 | 1710 | 14 | ○ |
| Ex. 210 | 1260 | 1.0 | 2662 | 1010 | 1.35 | 25 | 250 | 460 | 1290 | 3.5 | 65 | 0.61 | 0.46 | 1620 | 15 | ○ |
| Ex. 211 | 610 | 1.0 | 2667 | 620 | 1.55 | 90 | 480 | 510 | 1090 | 4.7 | 60 | 0.61 | 0.47 | 1760 | 13 | ○ |
| Ex. 212 | 895 | 1.6 | 2661 | 860 | 0.85 | 35 | 255 | 360 | 1150 | 3.1 | 45 | 0.65 | 0.52 | 1770 | 13 | ◎ |
| Ex. 213 | 1225 | 2.1 | 2663 | 850 | 0.65 | 85 | 270 | 470 | 1490 | 3.2 | 52 | 0.66 | 0.62 | 1766 | 14 | ◎ |
| Ex. 214 | 815 | 1.5 | 2665 | 410 | 1.2 | 85 | 320 | 420 | 1135 | 3.7 | 55 | 0.69 | 0.57 | 1770 | 8 | ◎◎ |
| Ex. 215 | 610 | 1.6 | 2661 | 385 | 0.35 | 229 | 260 | 295 | 970 | 3.4 | 45 | 0.61 | 0.45 | 1630 | 19 | ○ |
| Ex. 216 | 620 | 0.9 | 2661 | 495 | 0.65 | 125 | 360 | 285 | 980 | 2.9 | 69 | 0.62 | 0.45 | 1620 | 29 | x |
| Comp. Ex. 201 | 705 | 0.6 | 2657 | 495 | 0.41 | 210 | 125 | 670 | 840 | 8.0 | 55 | 0.51 | 0.39 | 1480 | 32 | x |
| Comp. Ex. 202 | 1320 | 0.65 | 2658 | 1096 | 0.38 | 225 | 230 | 630 | 1550 | 4.1 | 63 | 0.52 | 0.36 | 14602 | 31 | x |
| Comp. Ex. 203 | 915 | 0.55 | 2658 | 750 | 0.36 | 165 | 165 | 220 | 1100 | 2.0 | 72 | 0.49 | 0.37 | 1490 | 35 | x |
| Comp. Ex. 204 | 1025 | 0.75 | 2659 | 800 | 0.39 | 225 | 160 | 370 | 1165 | 3.1 | 80 | 0.5 | 0.34 | 1500 | 30 | x |

In the results of evaluation of fuel cell performance shown in Table 7, Examples 201 to 214 each had characteristics evaluated at Test 1 ($S_A$, IG'/IG, and G' peak position) and characteristics evaluated at Test 2 ($S_{2\text{-}10}$, $V_{2\text{-}10}$, $S_{10\text{-}50}$, and $S_2$) inside the ranges of the present invention and had a BET specific surface area $S_{BET}$, DBP oil absorption (X), $X/S_{BET}$, and G-band half width ($\Delta G$) inside the ranges of the present invention. As a result, these samples satisfied the "○" (good) level. In particular, Examples 212 to 214 each had a BET specific surface area $S_{BET}$, DBP oil absorption (X), and G-band half width ($\Delta G$) inside the preferable ranges, so satisfied the "◎" (very good) level or "◎◎" (excellent) level.

Note that, Example 215 is an example where the characteristics evaluated in Test 1 were in the ranges of the present invention, so is a working example. However, Example 215 had an $S_{2\text{-}10}$, $V_{2\text{-}10}$, $S_{10\text{-}50}$ outside the ranges, but the tion (X), $X/S_{BET}$, and G-band half width ($\Delta G$) was outside the range of the present invention failed to satisfy the "○" (good) levels of Tests 1 to 3.

The invention claimed is:

1. A supporting carbon material for a solid polymer fuel cell comprised of a porous carbon material having a specific surface area $S_A$ of mesopores of a pore size of 2 to 50 nm, found by analyzing a nitrogen adsorption isotherm of an adsorption process by the Dollimore-Heal method, of 600 m²/g to 1600 m²/g, having a relative intensity ratio (IG'/IG) of a peak intensity (IG') of a peak present in the G'-band of 2650 to 2700 cm⁻¹ in range at a Raman spectrum and a peak intensity (IG) of a peak present in the G-band of 1550 to 1650 cm⁻¹ of 0.8 to 2.2, and having a peak position of the G'-band of 2660 to 2670 cm⁻¹.

2. The supporting carbon material for a solid polymer fuel cell according to claim 1 wherein in said mesopores, mesopores with a pore size of 2 nm to less than 10 nm have a specific pore area $S_{2-10}$ of 400 m²/g to 1100 m²/g, mesopores with a pore size of 2 nm to less than 10 nm have a specific pore volume $V_{2-10}$ of 0.4 cc/g to 1.6 cc/g, and mesopores with a pore size of 10 nm to 50 nm have a specific pore area $S_{10-50}$ of 20 m²/g to 150 m²/g, and micropores of a pore size of less than 2 nm, found by analyzing a nitrogen adsorption isotherm of an adsorption process by the Horvath-Kawazoe method, have a pore area $S_2$ of 250 m²/g to 550 m²/g.

3. The supporting carbon material for a solid polymer fuel cell according to claim 2 wherein said specific pore area $S_{2-10}$ is 400 m²/g to 1000 m²/g, said specific pore volume $V_{2-10}$ is 0.4 cc/g to 1.4 cc/g, said specific pore area $S_{10-50}$ is 30 m²/g to 100 m²/g, and said specific pore area $S_2$ is 300 m²/g to 500 m²/g.

4. The supporting carbon material for a solid polymer fuel cell according to claim 1 wherein a specific surface area $S_{BET}$ by the BET method is 600 m²/g to 1500 m²/g, the DBP oil absorption X is 200 cm³/100 g to 650 cm³/100 g, a ratio (X/$S_{BET}$) of said DBP oil absorption X and said specific surface area $S_{BET}$ is 3 nm to 5 nm, and a half width of a peak present in the range of 1550 to 1650 cm⁻¹ called the G-band is 30 cm⁻¹ to 75 cm⁻¹.

5. The supporting carbon material for a solid polymer fuel cell according to claim 4 wherein said specific surface area $S_{BET}$ is 800 m²/g to 1300 m²/g, said DBP oil absorption X is 300 cm³/100 g to 550 cm³/100 g, the ratio (X/$S_{BET}$) of said DBP oil absorption X and said specific surface area $S_{BET}$ is 3 nm to 5 nm, and said half width is 50 cm⁻¹ to 70 cm⁻¹.

6. The supporting carbon material for a solid polymer fuel cell according to claim 1 wherein said specific surface area $S_A$ is 700 m²/g to 1400 m²/g and a relative intensity ratio (IG'/IG) of the G'-band and G-band is 1.0 to 2.0.

7. The supporting carbon material for a solid polymer fuel cell according to claim 1 wherein said specific surface area $S_A$ is 700 m²/g to 1400 m²/g and a peak position of the G'-band is 2662 to 2668 cm⁻¹.

8. The supporting carbon material for a solid polymer fuel cell according to claim 1 wherein said specific surface area $S_A$ is 700 m²/g to 1400 m²/g, a relative intensity ratio (IG'/IG) of the G'-band and G-band is 1.0 to 2.0, and a peak position of the G'-band is 2662 to 2668 cm⁻¹.

9. A catalyst metal particle-supporting carbon material for a solid polymer fuel cell comprised of a supporting carbon material for a solid polymer fuel cell according to claim 1 on which platinum alone or mainly platinum catalyst metal particles are supported.

10. The supporting carbon material for a solid polymer fuel cell according to claim 2 wherein a specific surface area $S_{BET}$ by the BET method is 600 m²/g to 1500 m²/g, the DBP oil absorption X is 200 cm³/100 g to 650 cm³/100 g, a ratio (X/$S_{BET}$) of said DBP oil absorption X and said specific surface area $S_{BET}$ is 3 nm to 5 nm, and a half width of a peak present in the range of 1550 to 1650 cm⁻¹ called the G-band is 30 cm⁻¹ to 75 cm⁻¹.

11. The supporting carbon material for a solid polymer fuel cell according to claim 3 wherein a specific surface area $S_{BET}$ by the BET method is 600 m²/g to 1500 m²/g, the DBP oil absorption X is 200 cm³/100 g to 650 cm³/100 g, a ratio (X/$S_{BET}$) of said DBP oil absorption X and said specific surface area $S_{BET}$ is 3 nm to 5 nm, and a half width of a peak present in the range of 1550 to 1650 cm⁻¹ called the G-band is 30 cm⁻¹ to 75 cm⁻¹.

12. The supporting carbon material for a solid polymer fuel cell according to claim 2 wherein said specific surface area $S_A$ is 700 m²/g to 1400 m²/g and a relative intensity ratio (IG'/IG) of the G'-band and G-band is 1.0 to 2.0.

13. The supporting carbon material for a solid polymer fuel cell according to claim 3 wherein said specific surface area $S_A$ is 700 m²/g to 1400 m²/g and a relative intensity ratio (IG'/IG) of the G'-band and G-band is 1.0 to 2.0.

14. The supporting carbon material for a solid polymer fuel cell according to claim 4 wherein said specific surface area $S_A$ is 700 m²/g to 1400 m²/g and a relative intensity ratio (IG'/IG) of the G'-band and G-band is 1.0 to 2.0.

15. The supporting carbon material for a solid polymer fuel cell according to claim 5 wherein said specific surface area $S_A$ is 700 m²/g to 1400 m²/g and a relative intensity ratio (IG'/IG) of the G'-band and G-band is 1.0 to 2.0.

16. The supporting carbon material for a solid polymer fuel cell according to claim 2 wherein said specific surface area $S_A$ is 700 m²/g to 1400 m²/g and a peak position of the G'-band is 2662 to 2668 cm⁻¹.

17. The supporting carbon material for a solid polymer fuel cell according to claim 3 wherein said specific surface area $S_A$ is 700 m²/g to 1400 m²/g and a peak position of the G'-band is 2662 to 2668 cm⁻¹.

18. The supporting carbon material for a solid polymer fuel cell according to claim 4 wherein said specific surface area $S_A$ is 700 m²/g to 1400 m²/g and a peak position of the G'-band is 2662 to 2668 cm⁻¹.

19. The supporting carbon material for a solid polymer fuel cell according to claim 5 wherein said specific surface area $S_A$ is 700 m²/g to 1400 m²/g and a peak position of the G'-band is 2662 to 2668 cm⁻¹.

20. The supporting carbon material for a solid polymer fuel cell according to claim 2 wherein said specific surface area $S_A$ is 700 m²/g to 1400 m²/g, a relative intensity ratio (IG'/IG) of the G'-band and G-band is 1.0 to 2.0, and a peak position of the G'-band is 2662 to 2668 cm⁻¹.

* * * * *